US012691599B2

(12) United States Patent
Buntman et al.

(10) Patent No.: US 12,691,599 B2
(45) Date of Patent: Jul. 28, 2026

(54) REFILLABLE BLADE CARTRIDGE FOR RAZOR AND METHOD THEREFOR

(71) Applicant: FBA Operating Co., Dallas, TX (US)

(72) Inventors: Noah Buntman, Minneapolis, MN (US); Luke Tyson, Brooklyn, NY (US); Aaron Saxton, Los Angeles, CA (US); Matthew Saxton, Moorpark, CA (US)

(73) Assignee: FBA Operating Co., Dallas, TX (US)

( * ) Notice: Subject to any disclaimer, the term of this patent is extended or adjusted under 35 U.S.C. 154(b) by 120 days.

(21) Appl. No.: 18/906,480

(22) Filed: Oct. 4, 2024

(65) Prior Publication Data

US 2026/0097530 A1 Apr. 9, 2026

(51) Int. Cl.
*B65D 83/10* (2006.01)
*B26B 21/40* (2006.01)

(52) U.S. Cl.
CPC .......... *B26B 21/4012* (2013.01); *B65D 83/10* (2013.01)

(58) Field of Classification Search
CPC .... B65D 83/12; B65D 83/10; B65D 2209/00; B65D 83/0829; B65D 83/0817; B62B 1/4012; B62B 21/52
USPC ....... 221/265, 102, 232, 231, 268, 270, 272, 221/277, 263; 206/355, 359; 30/40, 40.2
See application file for complete search history.

(56) References Cited

U.S. PATENT DOCUMENTS

| | | | | | |
|---|---|---|---|---|---|
| 2,288,979 | A * | 7/1942 | Testi | B65D 83/10 | 206/355 |
| 2,685,364 | A * | 8/1954 | Treiss | B65D 83/10 | 221/102 |
| 4,850,512 | A * | 7/1989 | Vujovich | B65D 83/10 | 206/355 |
| 8,535,618 | B1 * | 9/2013 | Werner | G01N 33/48757 | 422/50 |
| 9,823,234 | B2 * | 11/2017 | Logel | B65D 83/0829 | |
| 2002/0057993 | A1 * | 5/2002 | Maisey | G01N 33/48757 | 422/430 |
| 2003/0121932 | A1 * | 7/2003 | Wajda | B65D 83/087 | 221/259 |
| 2014/0034665 | A1 * | 2/2014 | Walter | B65D 83/08 | 221/102 |
| 2017/0166388 | A1 * | 6/2017 | Yao | B65D 83/0829 | |

* cited by examiner

*Primary Examiner* — Timothy R Waggoner
(74) *Attorney, Agent, or Firm* — Robert D. Atkins; PATENT LAW GROUP: Atkins and Associates, P.C.

(57) ABSTRACT

A razor has a handle and a rotatable head assembly coupled to the handle. The rotatable head assembly has a magnetic pickup adapted to draw a blade from a blade cartridge to the rotatable head assembly. The rotatable head assembly has a blade platform to contain the blade, head flap rotatable about the blade platform, and hinge between the blade platform and the head flap. The blade platform has a ball plunger to contact the external source and a keyed riser to hold the blade. A stand supports the razor over a vertical surface or horizontal surface. The blade cartridge has a housing, blade drawer disposed within the housing, and roller disposed over the blade drawer to pick up a blade from the blade drawer. The blade drawer has a blade platform to hold a plurality of blades, and spring element to apply pressure to the blade platform.

20 Claims, 27 Drawing Sheets

REFILLABLE BLADE CARTRIDGE FOR RAZOR AND METHOD THEREFOR

RELATED APPLICATIONS

The present application is related to patent application titled Handheld Razor and Method Therefor, filed concurrently herewith.

FIELD OF THE INVENTION

The present invention relates in general to hair cutting devices and, more particularly, to a refillable blade cartridge for a razor and method of making the refillable blade cartridge.

BACKGROUND OF THE INVENTION

People commonly use a razor to remove hair from various body parts. The razor can cut hair from the facial area, under the arms, chest, legs, and other body parts. A handheld razor can be disposable or capable of receiving a new blade. In the case of a disposable razor, the components are relatively low quality as the entire razor is discarded after one or more uses. A disposable razor is often perceived as clean and convenient, but it is also understood to be wasteful and harmful to the environment. A refillable razor typically has a rotatable head unit and a blade integral to the rotatable head unit. To replace the blade, the rotatable head unit is removed from the handle and the entire rotatable head unit, including the integral blade, is replaced. Similar to the disposable razor, replacing the entire rotatable head unit is considered clean and convenient, yet wasteful and harmful to the environment.

A need exists for a razor and blade dispenser that can change the blade without discarding major components of the razor.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
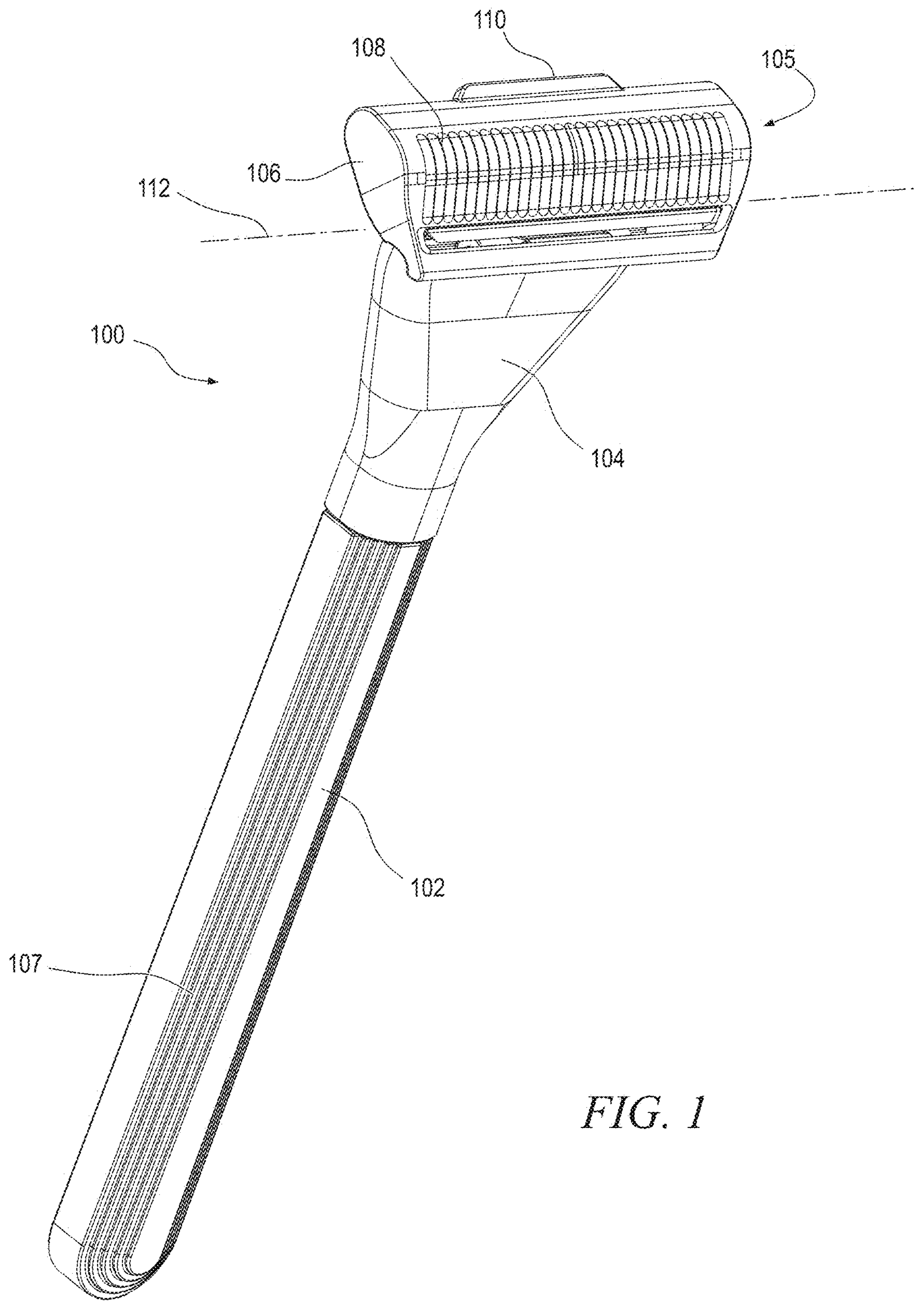
FIG. 1 is a perspective view of a handheld razor with handle, shoulder, and rotatable head assembly.

FIG. 1 shows a refillable body razor 100 including handle or shaft 102, angled shoulder 104, and rotatable head assembly 105. Rotatable head assembly 105 includes head flap 106 and blade platform 121 rotating about hinge 134 along axis 112. Handle 102 can have ridges or stepped pattern 107 to improve grip in wet conditions. Handle 102 and shoulder 104 can be a unitary molded body, made from a polymer or metal. In one embodiment, handle 102 is an oxidized aluminum. Alternatively, handle 102 is made separately from shoulder 104 and then attached with an adhesive or other attachment mechanism. Head flap 106 includes openings 108 to channel hair strands toward an internal razor cutting surface. Tab 110 allows the user to open head flap 106 by an integrated hinge 134 pivoting along axis 112. In one embodiment, shoulder 104 is an oxidized aluminum and head flap 106 is an oxidized zinc alloy.

Figure 2C:
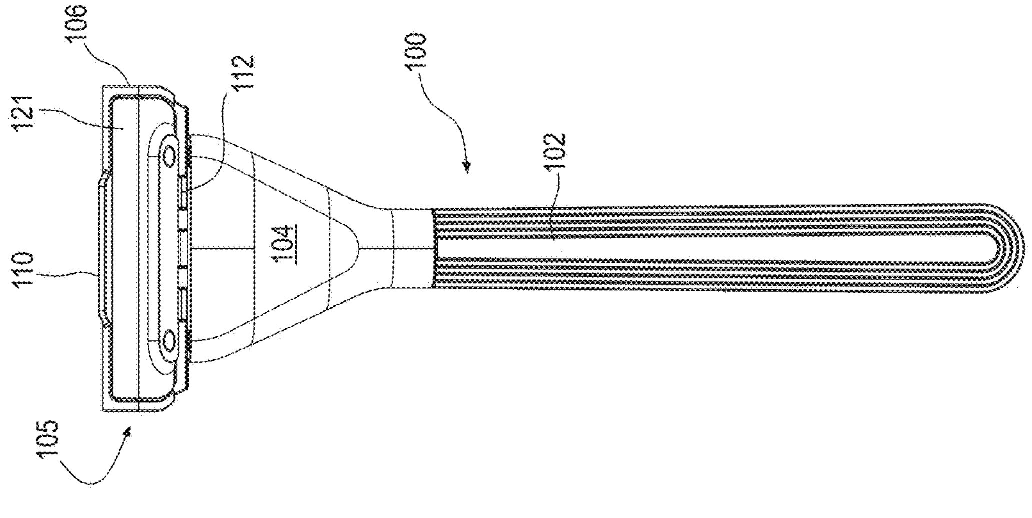
FIGS. 2*a*-2*c* illustrate the handheld razor from a front view, side view, and back view.
Figure 2B:
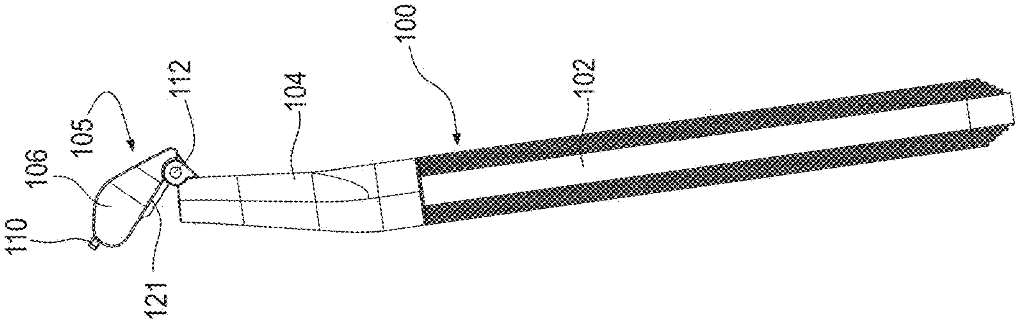
Figure 2A:
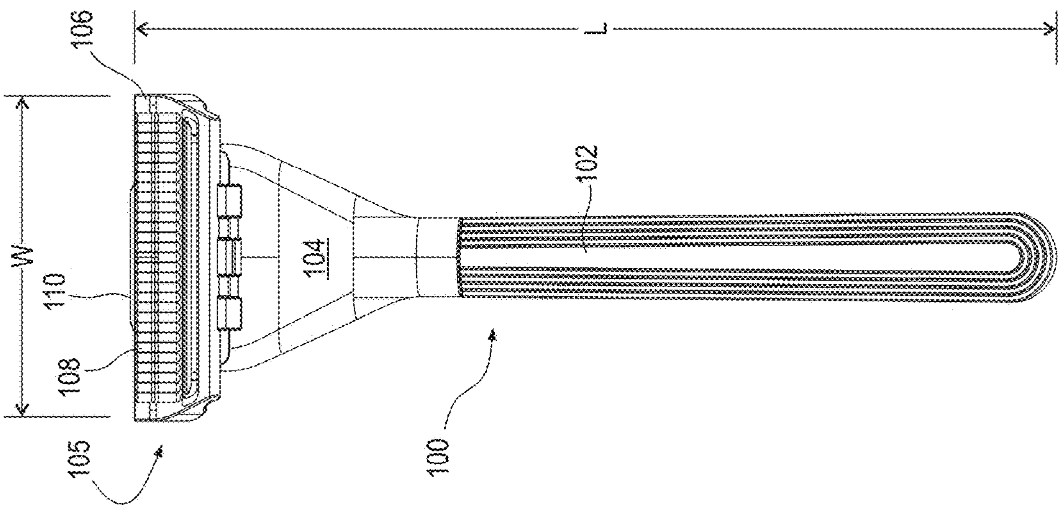

FIG. 2*a* is a front view of razor 100 with handle 102, shoulder 104, and rotatable head assembly 105 with head flap 106 and blade platform 121. FIG. 2*b* is a side view of razor 100 with handle 102, shoulder 104, and rotatable head assembly 105 with head flap 106 and blade platform 121. FIG. 2*c* is a back view of razor 100 with handle 102, shoulder 104, and rotatable head assembly 105 with head flap 106 and blade platform 121. In one embodiment, razor 100 has a length L of 13.0 centimeters (cm) and width W of 4.5 cm.

Figure 3A:
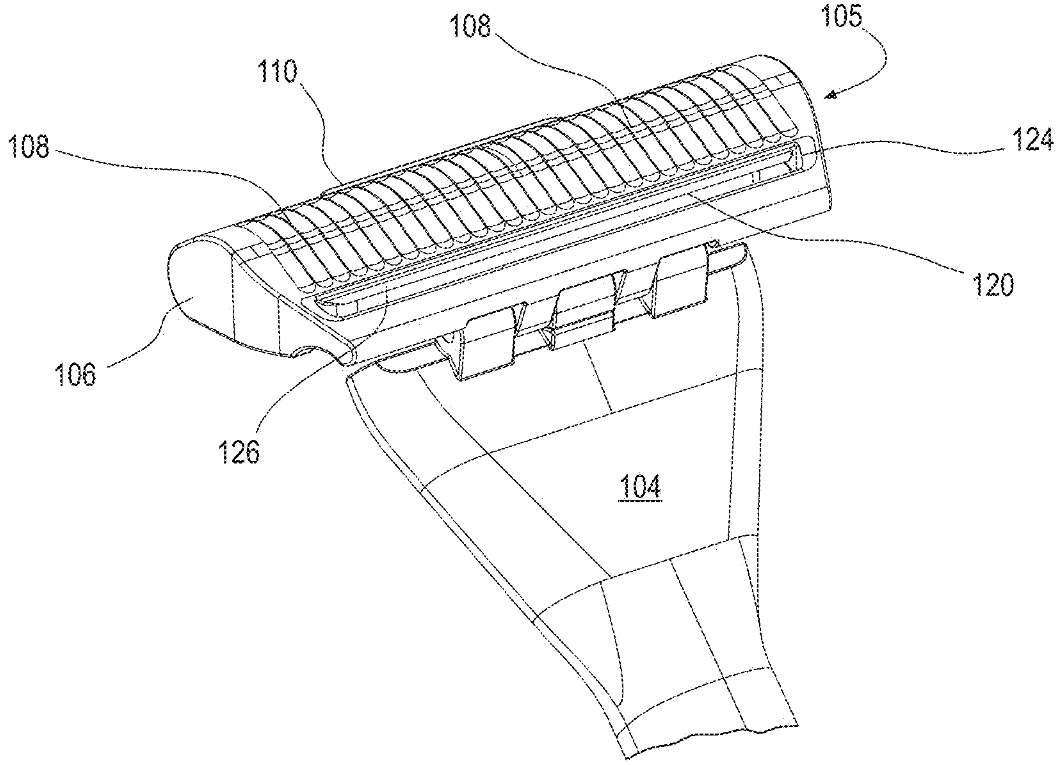
FIGS. 3*a*-3*b* illustrate the rotatable head assembly of the handheld razor.
Figure 3B:
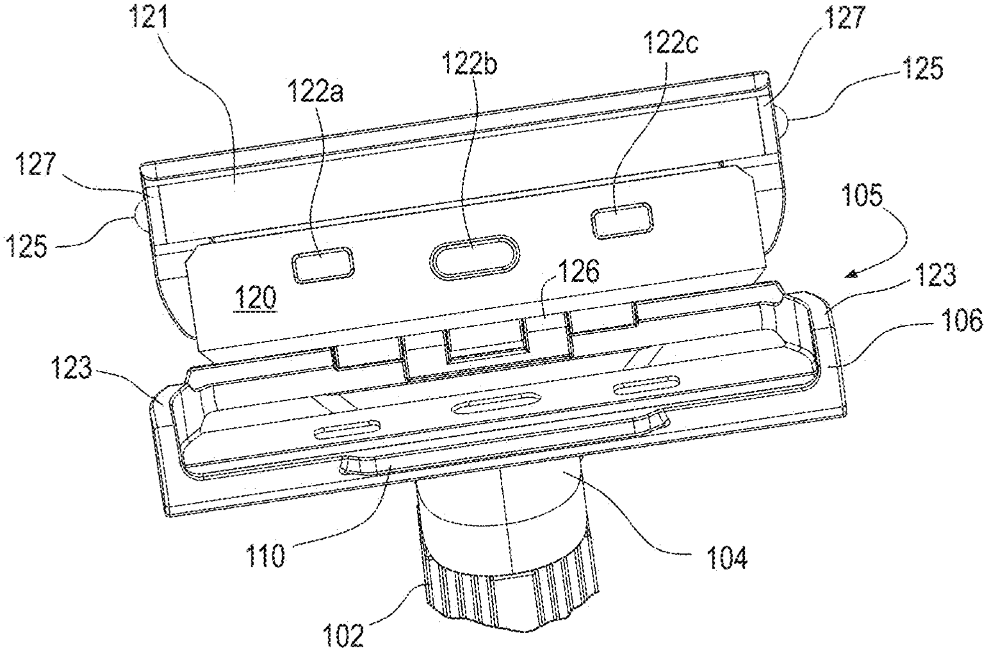

FIG. 3*a* shows further detail of head flap 106 and openings 108. Head flap 106 is beveled and rotatable with respect to handle 102 to improve the angle of contact to the user's body, see FIG. 14*a*. Head flap 106 and blade platform 121, or portions thereof, are made with opposing magnetic materials. For example, head flap 106 includes a first ferromagnetic material, such as iron, nickel, cobalt, gadolinium, dysprosium, and alloys thereof. The first magnetic material can also be neodymium iron boron (NdFeb), alnico, ferrite, samarium cobalt, or magnetic rubber. Blade platform 121 includes a second ferromagnetic material, or other material magnetically attractive to the first magnetic material. The magnetic material can be a portion of head flap 106 and/or blade platform 121. For example, a magnetic bar or pad 123 can be disposed within head flap 106, and an attractive material, bar, or pad 127 can be disposed within blade platform 121. In its normal state, head flap 106 is drawn to blade platform 121 by magnetic forces of the opposing materials, as in FIG. 3*a*. By application of the user's finger with the aid of tab 110 to overcome the magnetic attraction, head flap 106 opens to expose internal disposable razor blade 120 on blade platform 121, as in FIG. 3*b*. When the finger pressure is released, head flap 106 snaps back to its position in FIG. 3*a* due to the magnetic attraction between the head flap and blade platform. Head flap 106 and blade platform 121 can also use spring assist with or without magnetic attraction to snap the head flap back to the blade platform. Razor blade 120 is held in place during the shaving operation with spring-loaded keyed risers 122*a*, 122*b*, and 122*c*. The cutting edge 126 of razor blade 120 is exposed through opening 124 in head flap 106, as shown in FIGS. 3*a*-3*b*. In one embodiment, blade platform 121 and spring-loaded keyed risers 122*a*, 122*b*, and 122*c* are an oxidized zinc alloy or other metal.

Figure 4A:
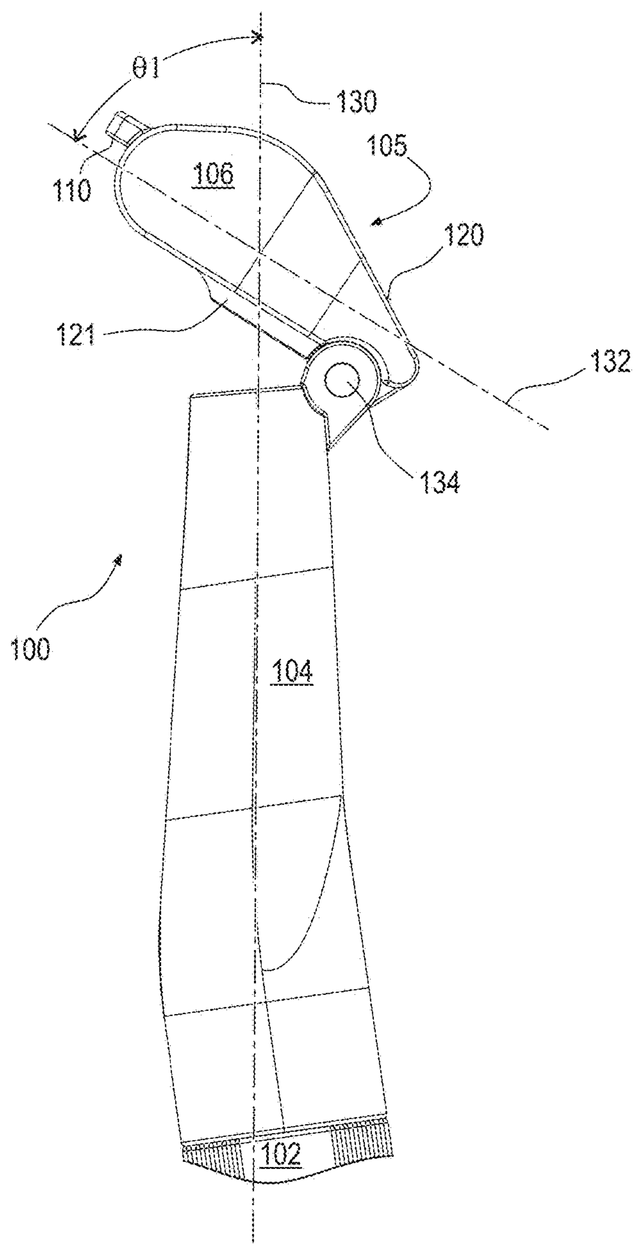
FIGS. 4*a*-4*e* illustrate rotation or pivoting of the head assembly of the handheld razor.
Figure 4B:
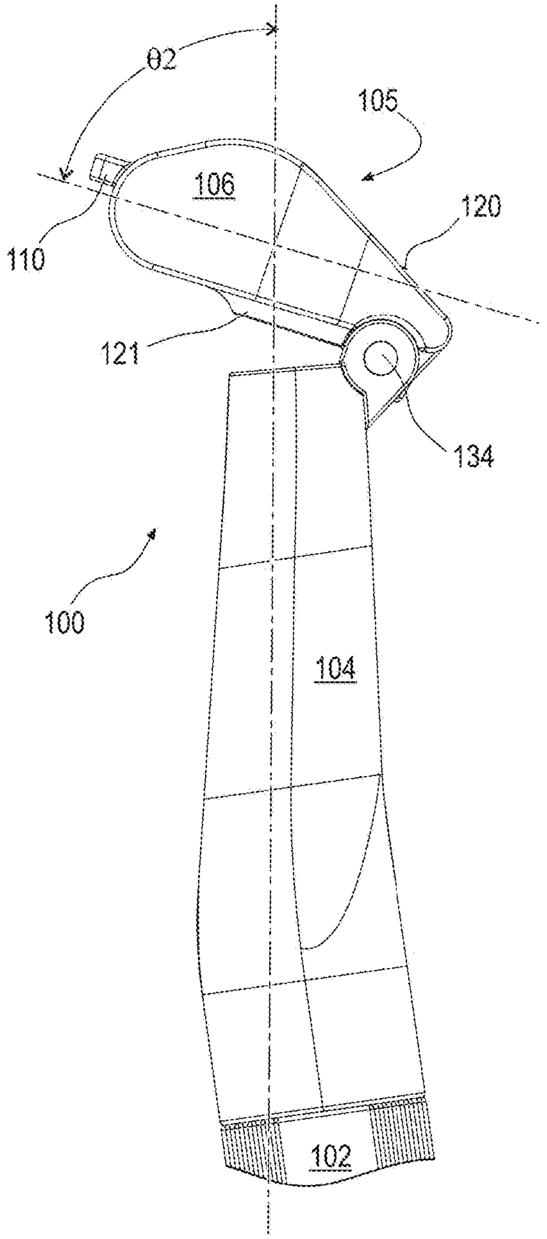
Figure 4C:
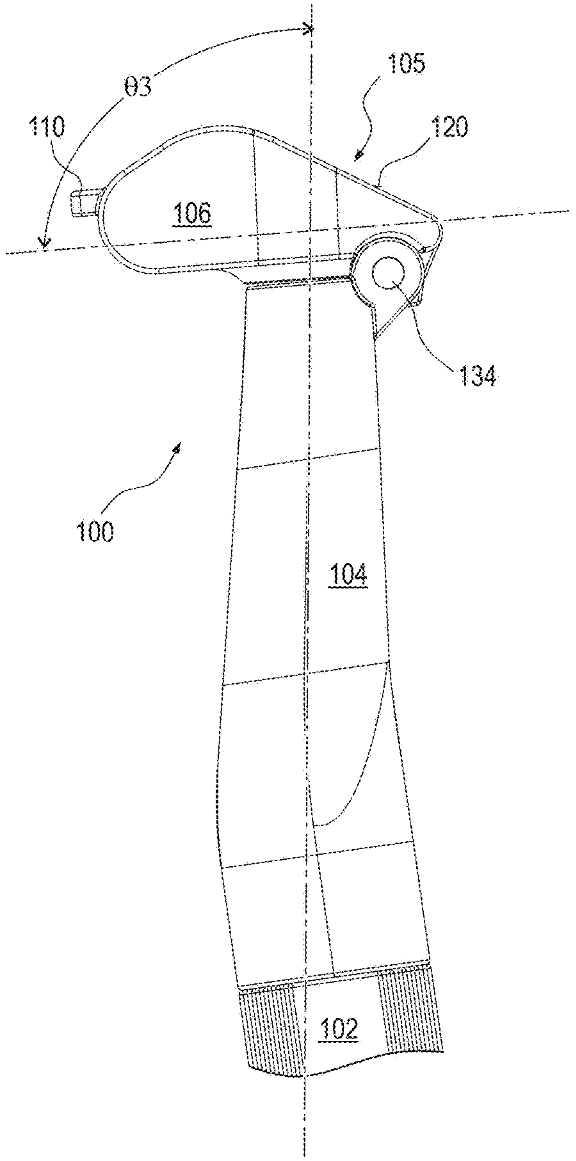
Figure 4D:
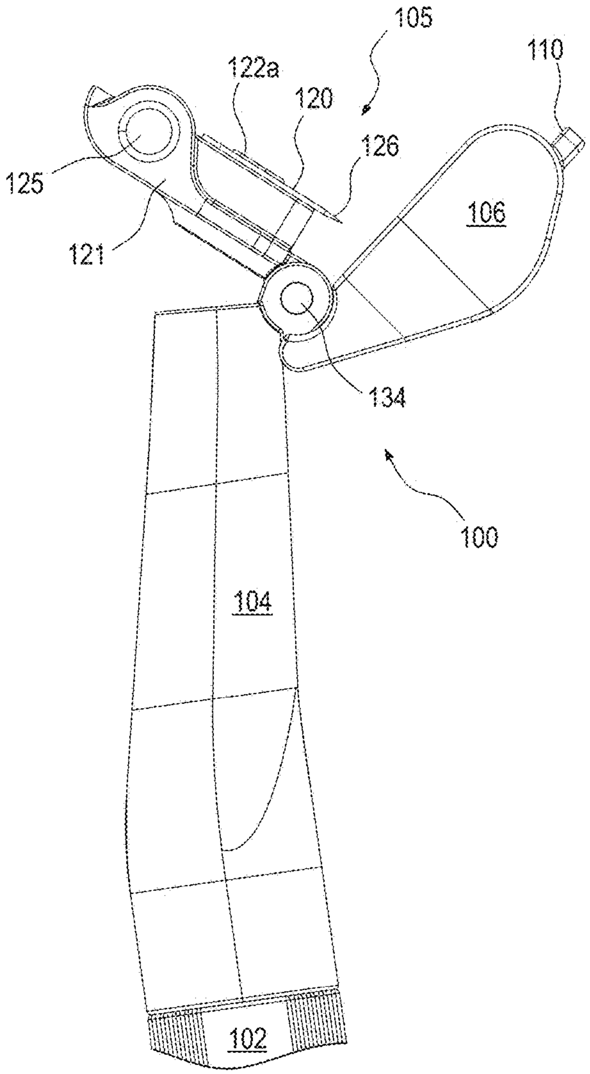
Figure 4E:
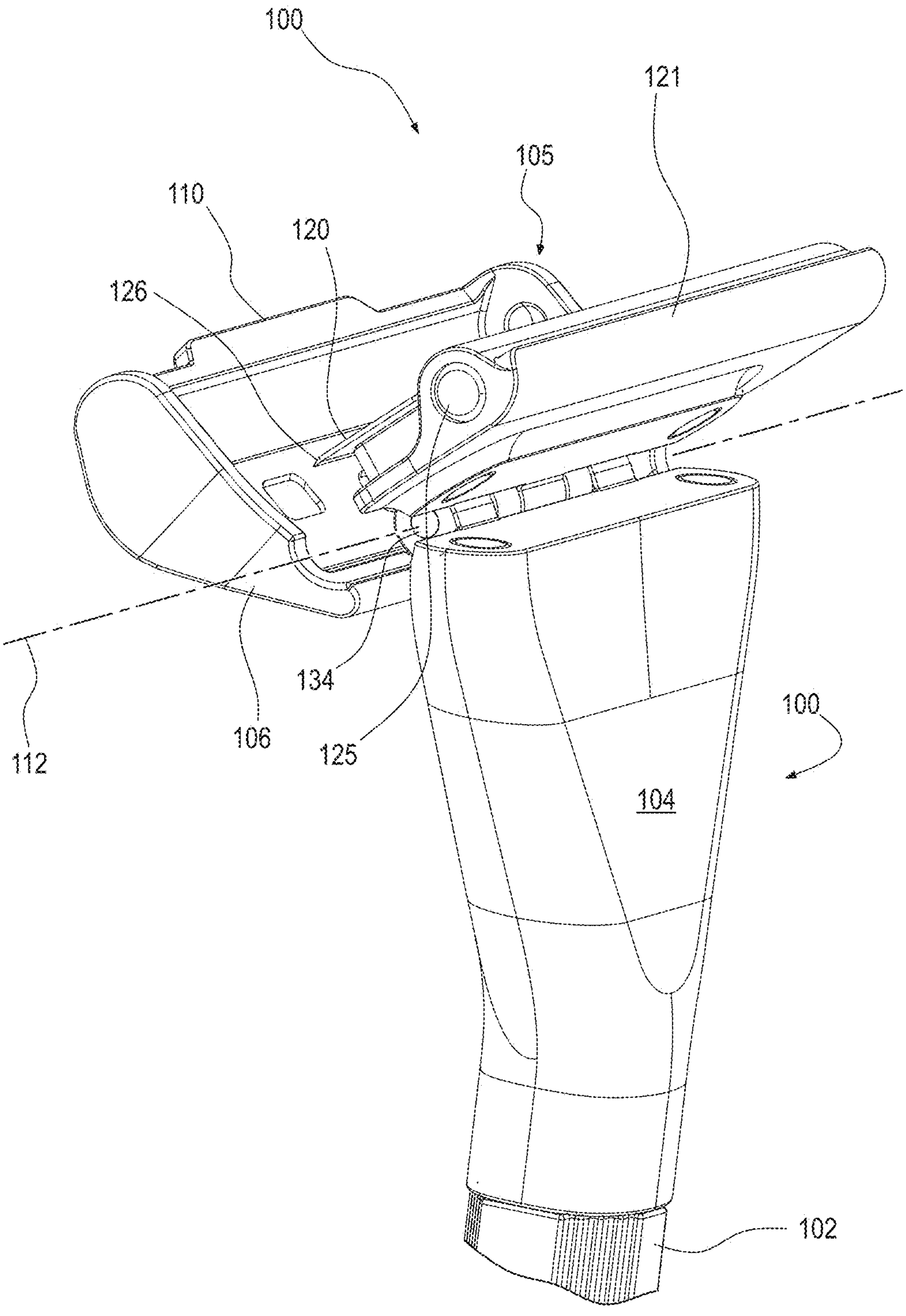

In FIG. 4*a*, head flap 106 is in the normal, relaxed position at an angle θ1 of about 37.0 degrees between axis 130 of handle 102 and axis 132 of head flap 106. In FIG. 4*b*, head flap 106 can be rotated or pivoted about integrated hinge 134 along axis 112 to angle θ2 greater than angle θ1 by pressing on the head with a user body part. In FIG. 4*c*, head flap 106 is rotated or pivoted about integrated hinge 134 along axis 112 its full extension at angle θ3 greater than angle θ2. In FIG. 4*d*, head flap 106 is rotated or pivoted in the opposite direction about integrated hinge 134 along axis 112 by applying pressure to tab 110, which lifts and opens the head flap to about 100 degrees with respect to blade 120 and exposes the razor blade. The position of head flap 106 in FIG. 4*d* is useful in loading a new blade and removing a spent blade. FIG. 4*e* shows another view of head flap 106 and blade platform 121 rotating about integrated hinge 134 along axis 112.

Figure 5:
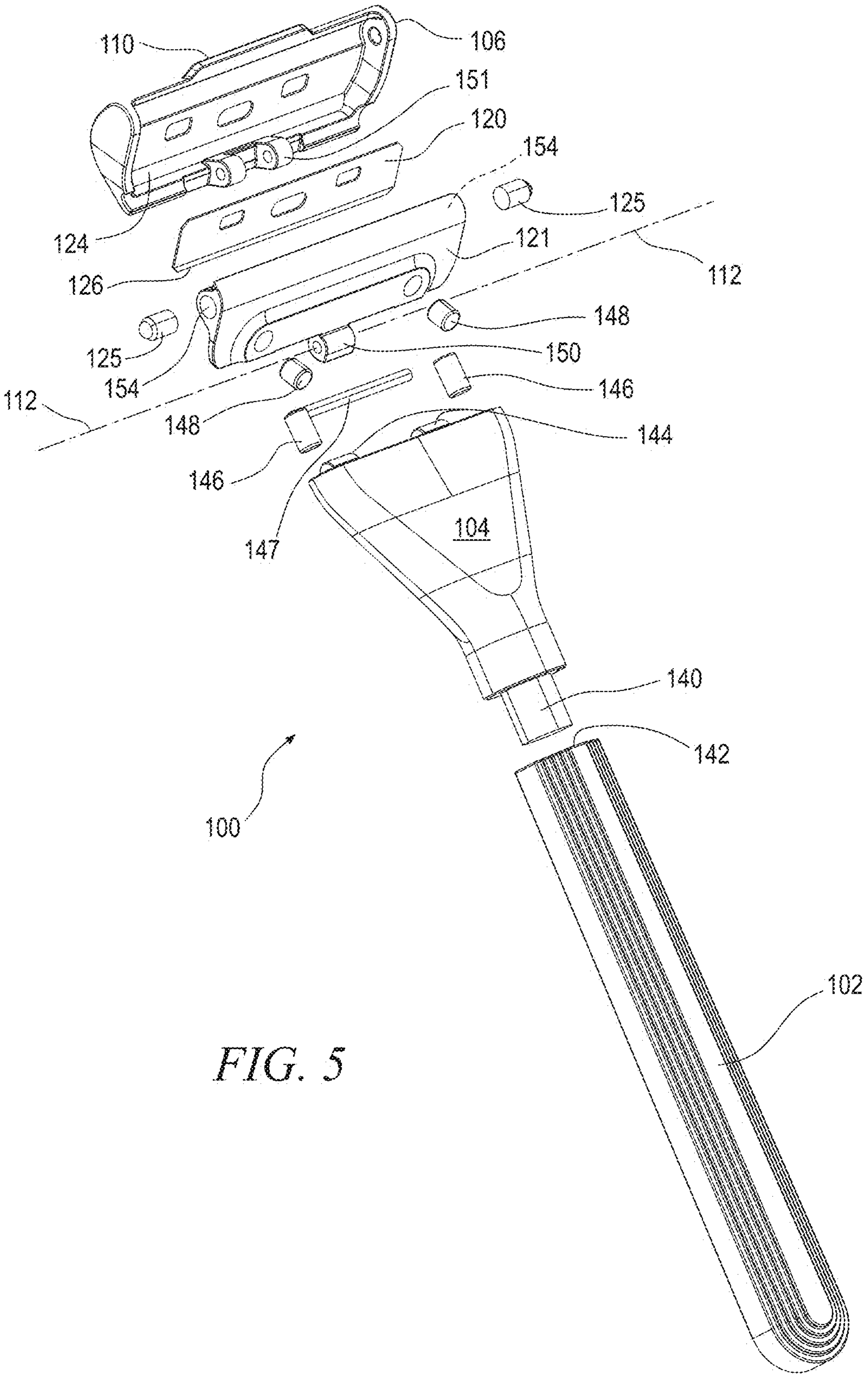
FIG. 5 illustrates an exploded view of the handheld razor.

FIG. 5 is an exploded view of razor 100. In particular, shaft 140 of shoulder 106 goes into cavity 142 of handle 102. In one embodiment, shaft 140 is secured in place in cavity 142 with an adhesive. Blade platform 121 is secured to shoulder 104 using spring-loaded spacers 144, alignment spacers 146 and 148, and shaft 147 disposed in clamps 150 and 151. In particular, shaft 147 inserts through clamps 150 and 151. Ball plungers 125 insert into cavities 154 of blade platform 121 for alignment with blade refill cartridge 180. Clamps 151 align with clamps 150 to allow the head flap to rotate about hinge 134 about axis 112. Hinge 134 manages both pivot of head assembly 105 and rotation of head flap 106. Hinge 134 allows head assembly 105 to follow the contour of the user's body part, and further to be opened to exchange the blade.

Figure 6A:
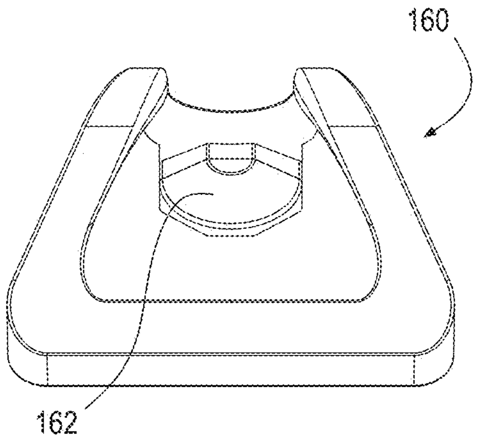
FIGS. 6*a*-6*f* illustrate a stand for the handheld razor to support the razor on a horizontal surface.
Figure 6B:
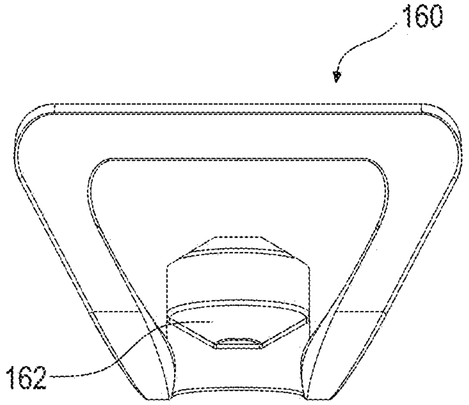
Figure 6C:
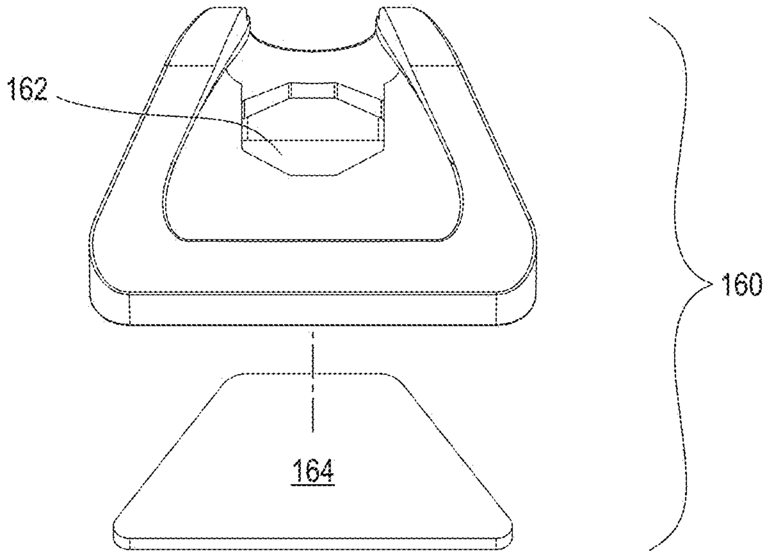
Figure 6D:
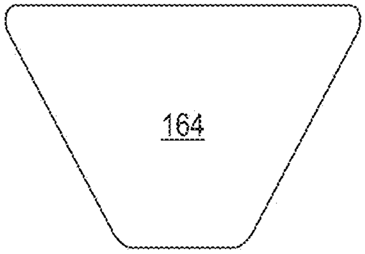
Figure 6E:
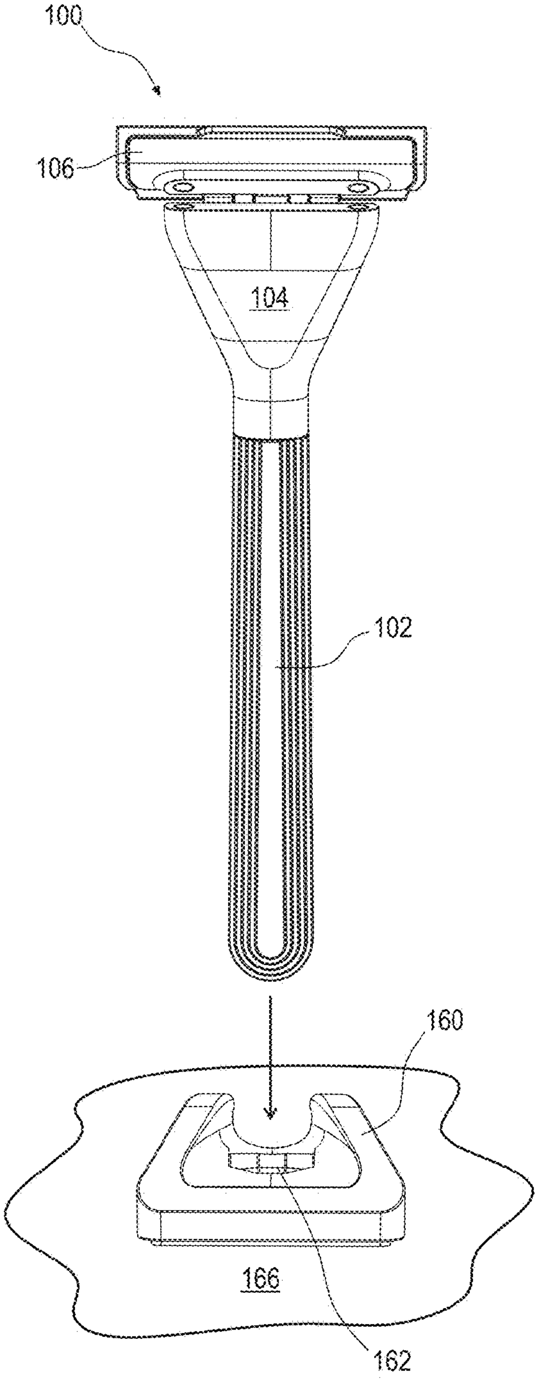
Figure 6F:
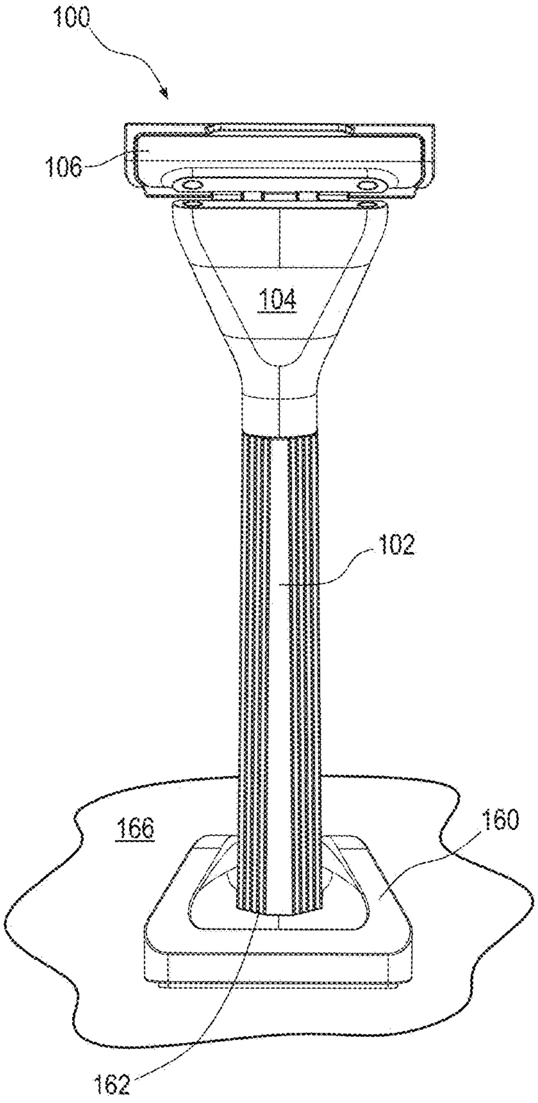

FIG. 6*a* shows stand 160 with cavity 162 adapted to receive a distal end of handle 102 relative to shoulder 104. FIG. 6*b* is a top view of stand 160 with cavity 162 adapted to receive a distal end of handle 102 relative to shoulder 104. FIG. 6*c* shows stand 160 disposed over bottom cap 164 having a non-slip surface. FIG. 6*d* is a bottom view of bottom cap 164. In one embodiment, bottom cap 164 is a micro-suction pad. Stand 160 is placed on a flat smooth horizontal surface, such as a bathroom counter, with bottom cap and non-slip surface 164 in contact with the counter. FIG. 6*e* shows razor 100 disposed over stand 160, as disposed on counter 166, with handle 102 aligned with cavity 162. Handle 102 is then disposed within cavity 162. FIG. 6*f* shows the distal end of handle 102 disposed within cavity 162 of stand 160 to maintain razor 100 in a stable, vertically oriented position when not in use. The vertically oriented position of razor 100 while in stand 160 provides for easy reach and grasping in preparation for use. Razor 100 can be readily lifted out of cavity 162 and the user can commence cutting intended hair strands.

Figure 7A:
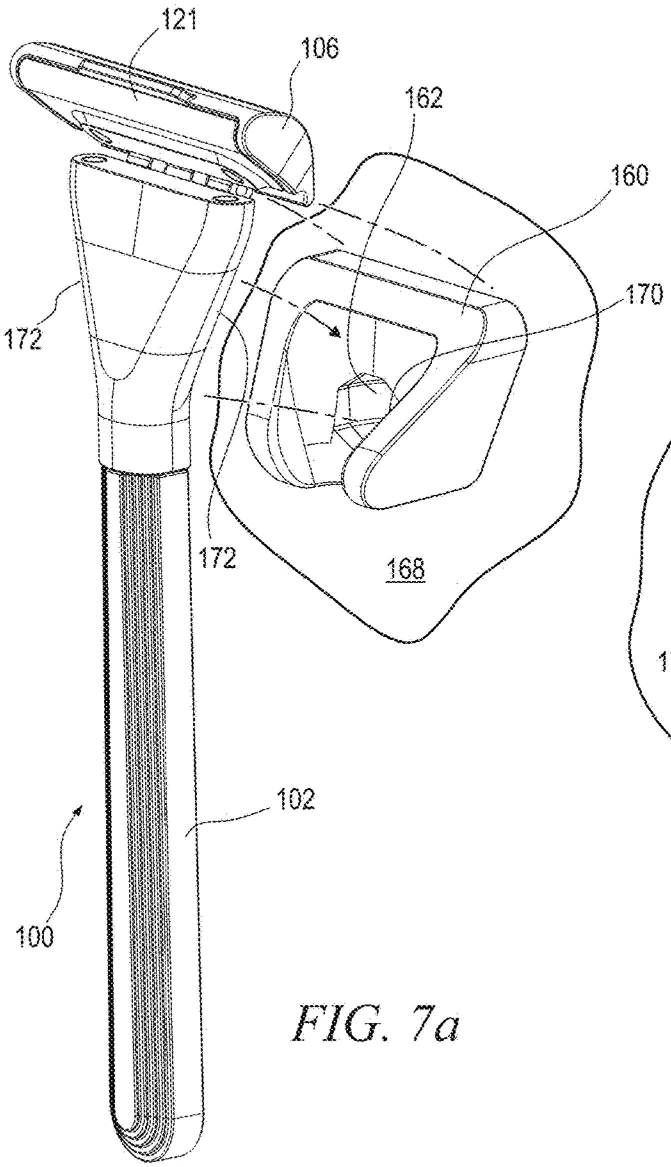
FIGS. 7*a*-7*b* illustrate a stand for the handheld razor to support the razor on a vertical surface.
Figure 7B:
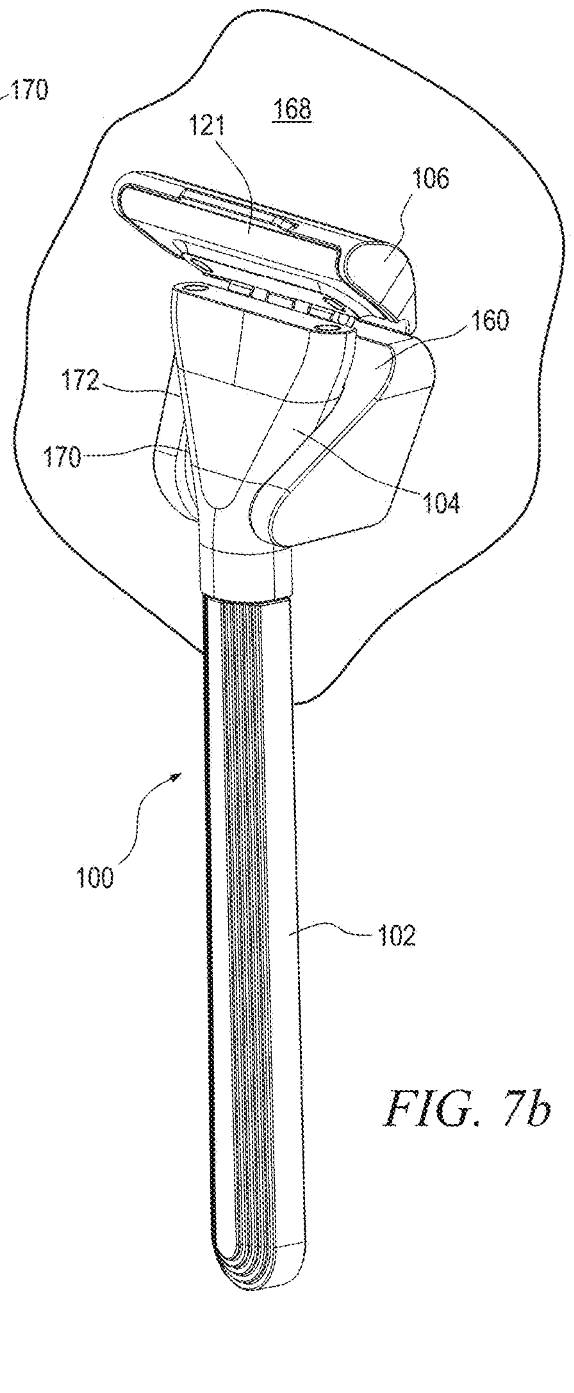

FIG. 7*a* shows stand 160 with cavity 162 mounted to wall or other vertical surface 168. In this case, beveled surfaces 170 hold razor 100. Razor 100 is disposed over stand 160 with beveled edges 172 aligned with similar beveled surface 170. FIG. 7*b* shows razor 100 disposed on stand 160 with beveled edges 172 contacting beveled surface 170. Stand 160 holds razor 100 in a stable, vertically oriented position when not in use. The vertically oriented position of razor 100 while on stand 160 provides for easy reach and grasping in preparation for use. Razor 100 can be readily lifted off stand 160 and the user can commence cutting intended hair strands.

Figures 8A, 8B, 8C, 8D, 8E:
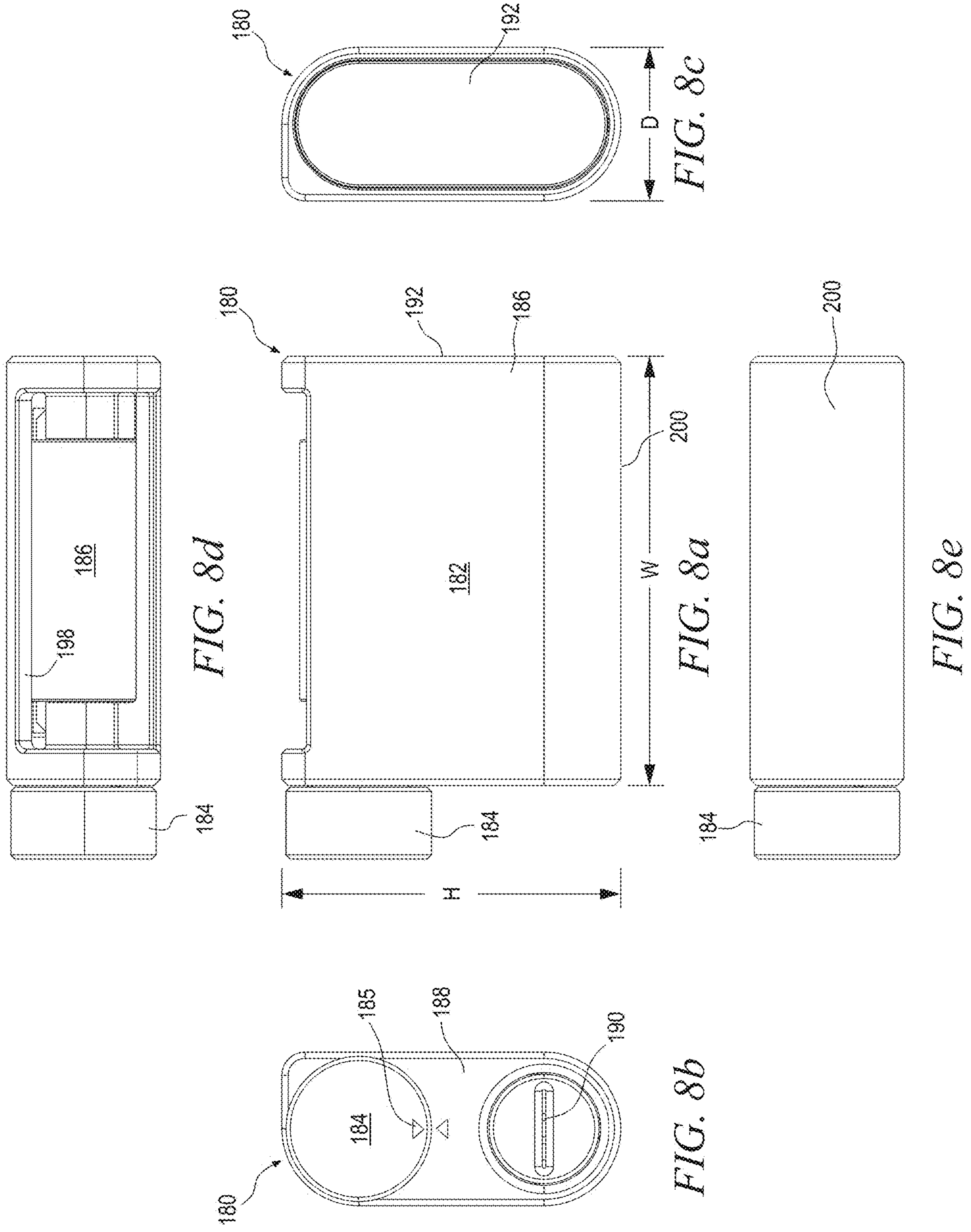
FIGS. 8*a*-8*e* illustrate a refillable blade cartridge compatible with the handheld razor.

Razor 100 requires blade 120 to perform its intended function, i.e., cutting hair strands on the user's body. For example, blade 120 will cut facial hair from the user's face. Alternatively, blade 120 will cut hair strands from under arms, legs, chest, back, or any other area of the body requiring treatment. FIG. 8*a* illustrates blade refill cartridge 180 adapted to replace blade 120 in blade platform 121 of razor 100. Blade refill cartridge 180 including a base or shell 182 having dimensions of 3.56 cm in height H, 5.08 cm width W, and 1.45 cm in depth D. Blade refill cartridge 180 contains both new blades and spent or used blades. Knob 184 rotates roller 186 by user action and presents new blades 120 to blade platform 121, as will be demonstrated. Knob 184 turns omni-directional, e.g., counterclockwise, to assist with proper rotation and operation and avoid user-induced jamming. FIG. 8*b* is a view of side surface 188 of base 182 including knob 184 and spent blade disposal slot 190 adapted to receive spent blades when inserted in an elongated, flat orientation for safe disposal and storage. Alignment arrows 185 show proper rotation of knob 184 to position blades 120 for pickup and loading. FIG. 8*c* is a view of side surface 192 of base 182. FIG. 8*d* is a top view of surface 194 including knob 184 and roller 186. FIG. 8*e* is a bottom view of surface 198 including knob 184. In one embodiment, base 182, knob 184, roller 186, and blade platform 121 are made with acrylonitrile butadiene styrene (ABS) or other polymer material.

Figure 9A:
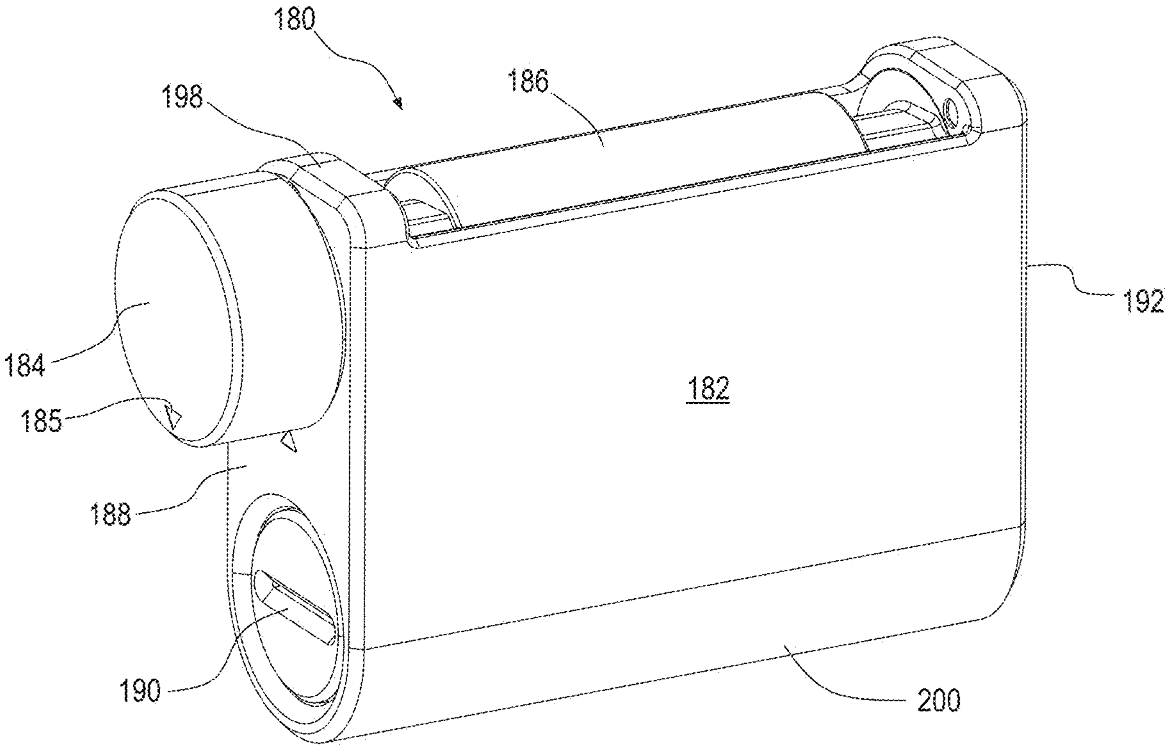
FIGS. 9*a*-9*b* illustrate perspective views of the refillable blade cartridge.
Figure 9B:
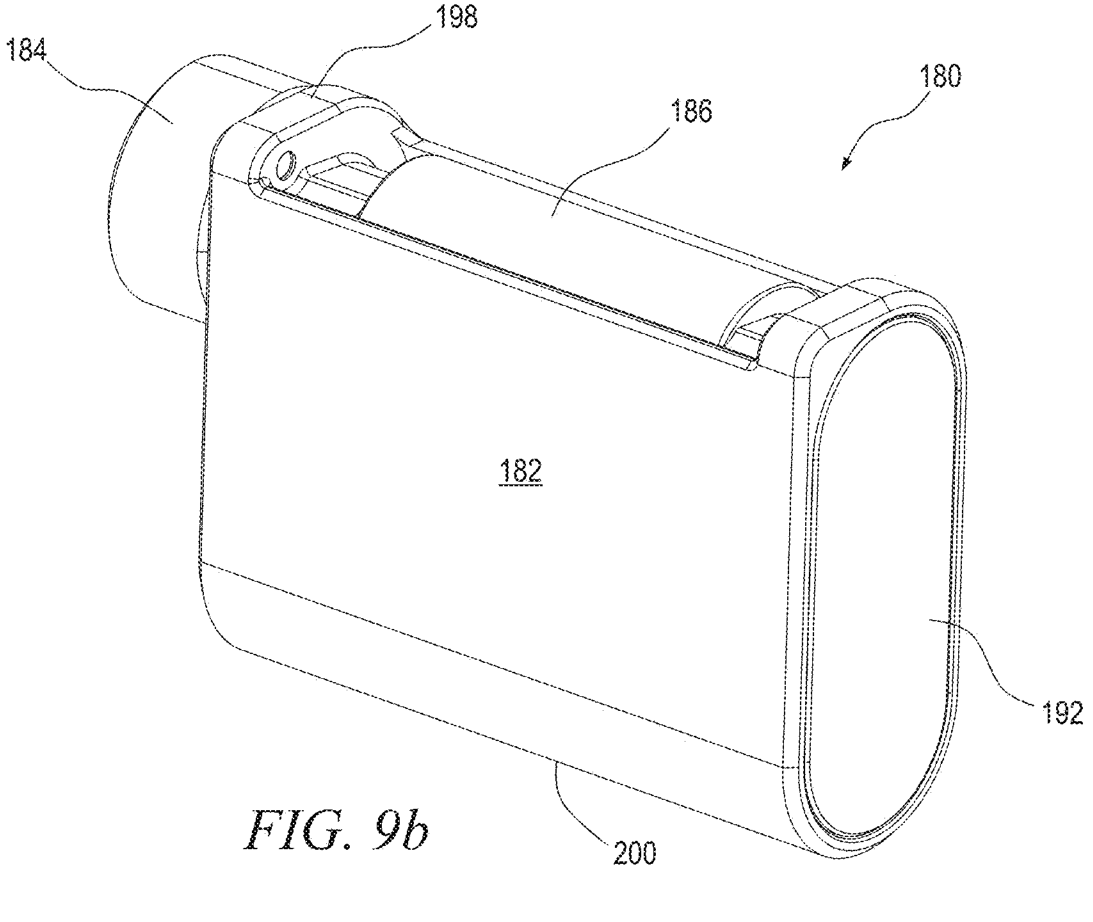

FIG. 9*a* is a first perspective view of blade refill cartridge 180 with knob 184, roller 186, and spent blade disposal slot 190. FIG. 9*b* is a second perspective view of blade refill cartridge 180 with knob 184 and roller 186.

Figure 10:
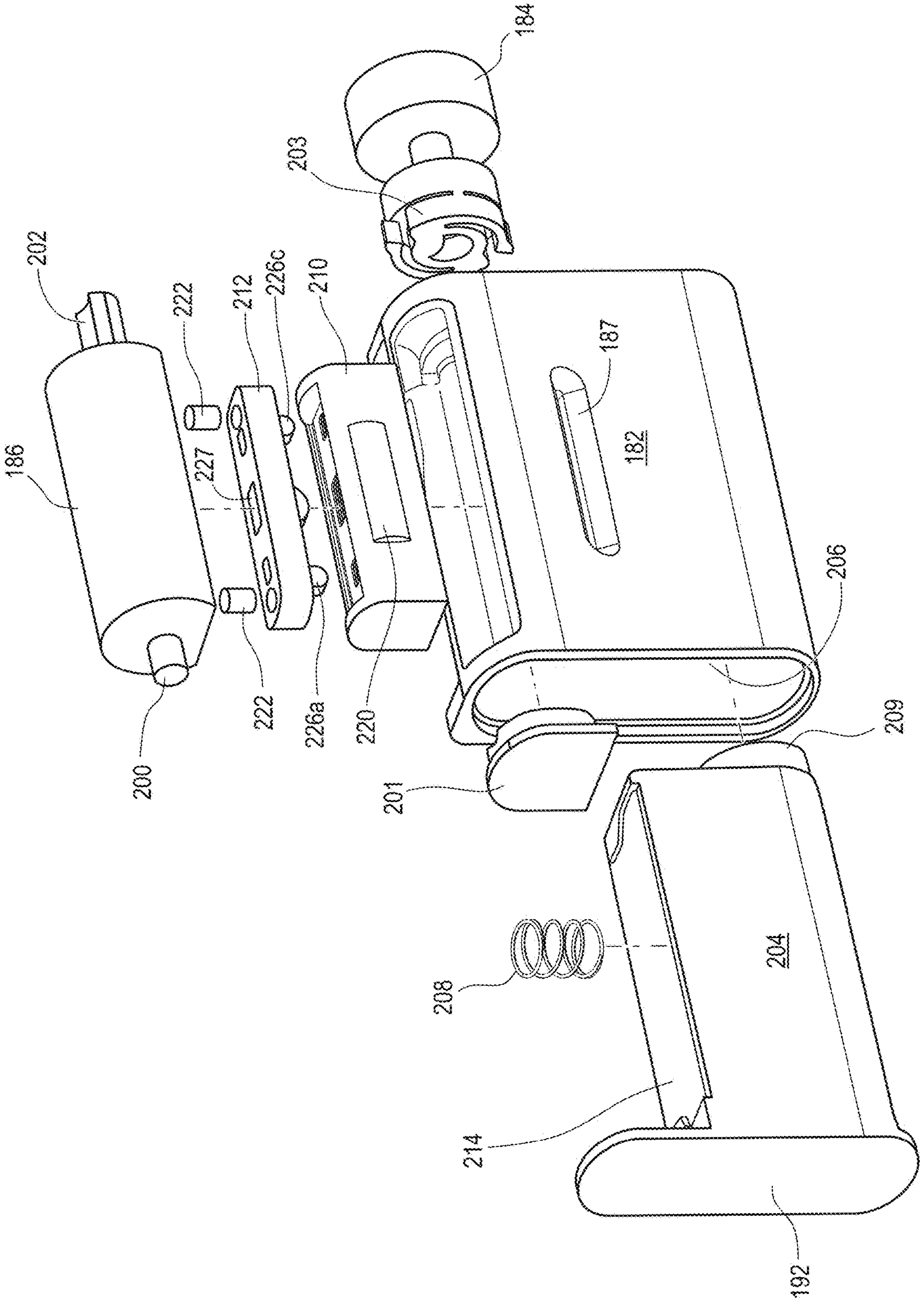
FIG. 10 illustrates an exploded view of the refillable blade cartridge.
Figure 11A:
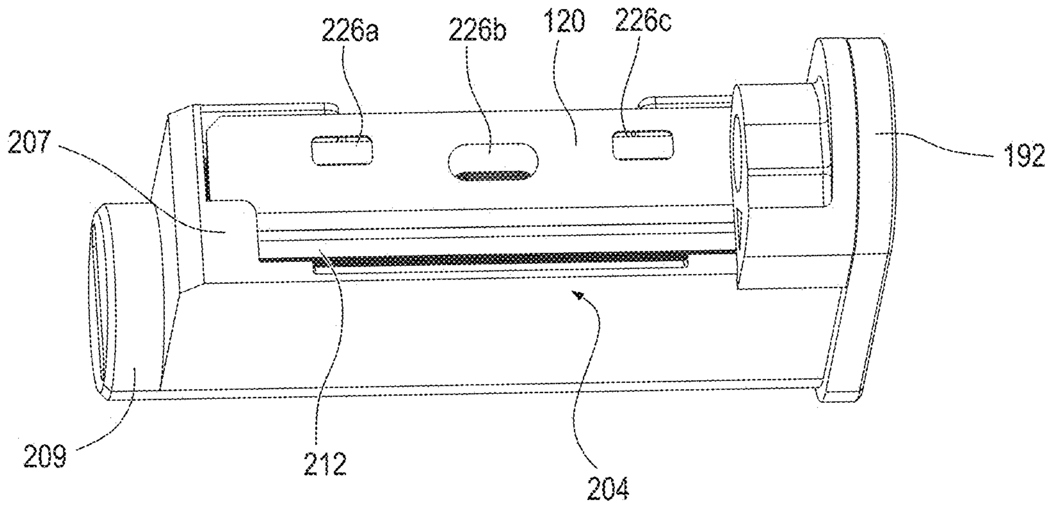
FIGS. 11*a*-11*f* illustrate various view of the blade drawer.
Figure 11B:
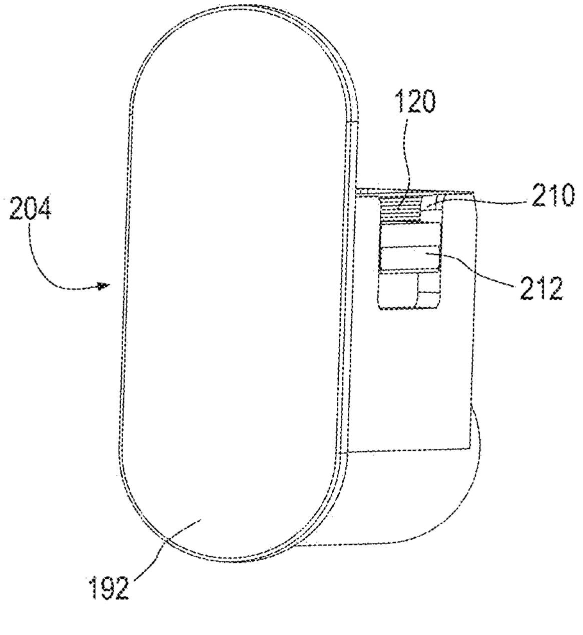
Figure 11C:
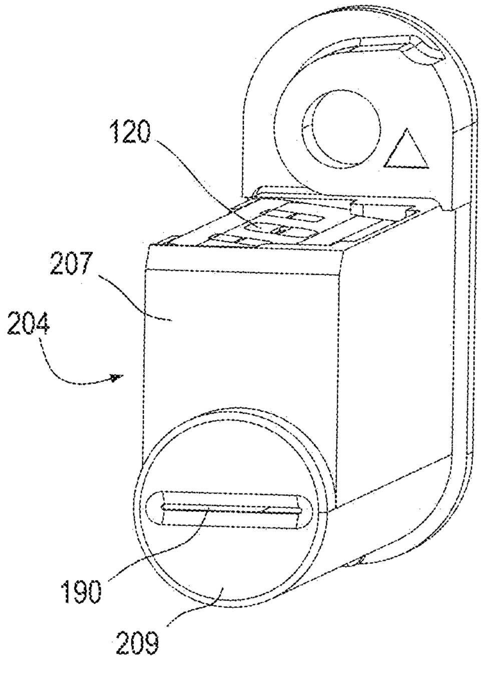

FIG. 10 is an exploded view of blade refill cartridge 180. Shaft 200 from roller 186 aligns with and is supported by end cap 201. Shaft 202 from roller 186 aligns with dial 203 and knob 184. Knob 184 turns dial 203 omni-directionally to turn shaft 202 and roller 186. Disposable blade drawer 204 is made with ABS or other polymer material and is adapted to insert into opening 206 of base 182. Spring element 208 is disposed within disposable blade drawer 204 to apply upward pressure on blade platform housing 210. Sprint element 208 can be a coil spring, leaf spring, or other mechanism forcing pressure against blade platform housing 210. Blade platform housing 210 contains blade platform 212 and blade platform 212 holds multiple blades 120. In one embodiment, blade platform 220 holds 6-8 fresh blades 120 visible through window 187. Window 187 will show the user that blades 120 are used up or exhausted, or near exhaustion, in order to plan replacement. Accordingly, blades 120 are disposed within blade platform 212. Blades 120 are held in place with spring-loaded keyed risers 226*a*-226*c* through openings 227. Blade platform 212, with blades 120, is disposed within blade platform housing 210, and blade platform housing 210 is disposed over spring element 208, all within cavity 214 of disposable blade drawer 204, as shown in FIG. 11*a*-11*c*. Friction pads 220 hold blade platform housing 210 within cavity 206 of disposable blade drawer 204. Alignment spacers 222 align blade platform 212 with roller 186. In one embodiment, blade platform housing 210 and blade platform 212 are made with ABS or other polymer material.

Figure 11D:
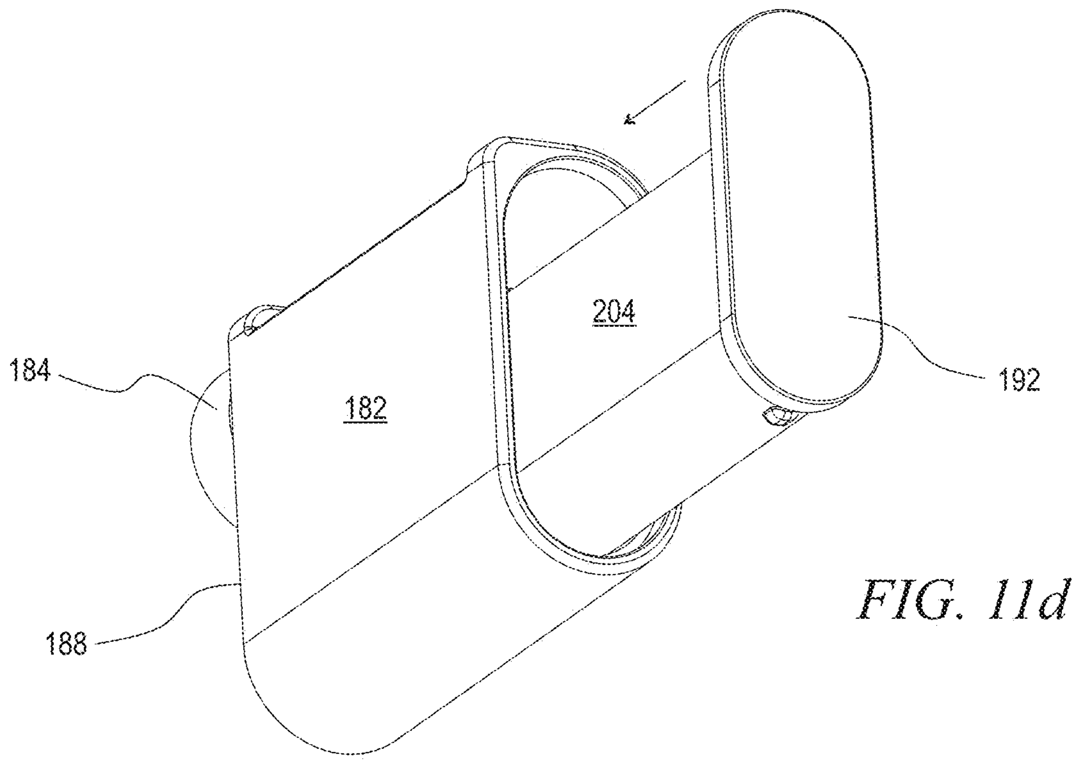
Figure 11E:
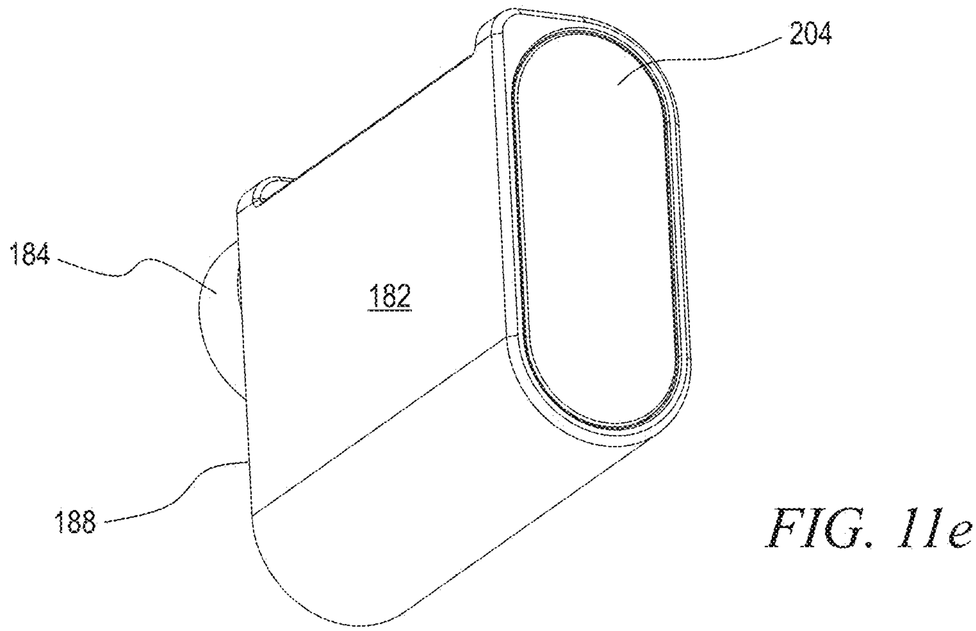
Figure 11F:
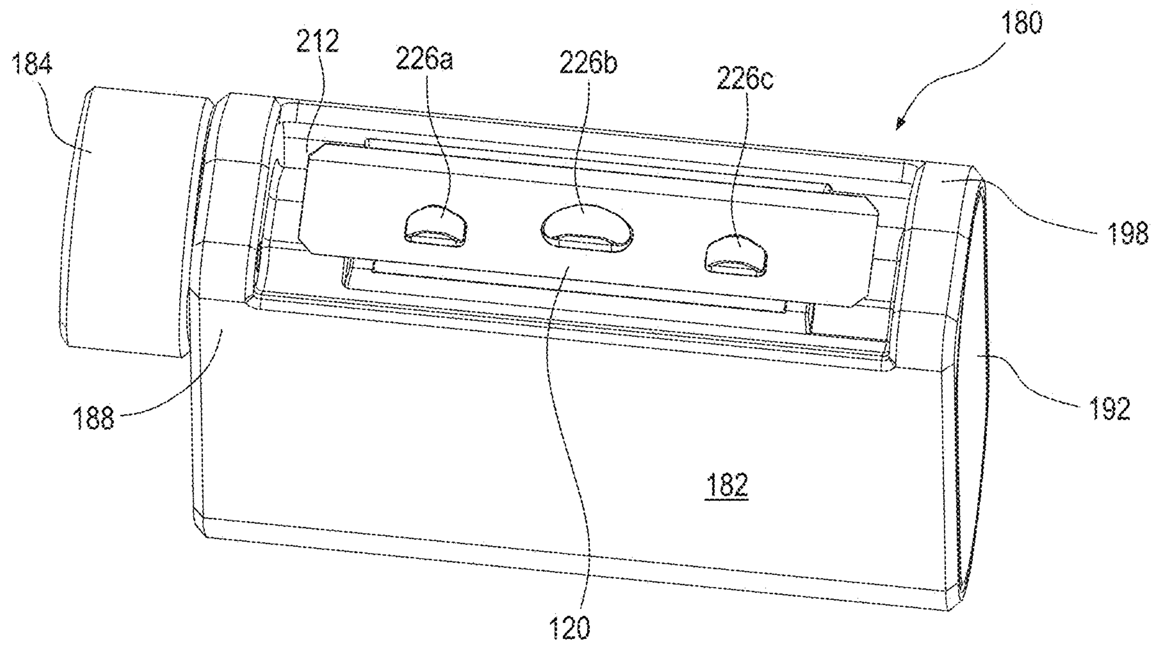

FIG. 11*a* shows further detail of new blades 120 loaded into blade platform 212 and disposed within cavity 206 of disposable blade drawer 204. FIG. 11*b* shows side surface 192 with blades 120 loaded into disposable blade drawer 204. FIG. 11*c* shows side surface 207 with spent blade disposal slot 190 on surface 209. FIG. 11*d* shows disposable blade drawer 204, leading with surface 209, being inserted into base 182. FIG. 11*e* shows disposable blade drawer 204 fully inserted into base 182. FIG. 11*f* shows disposable blade drawer 204 fully inserted into base 182 with blade 120 exposed and held in position by keyed risers 226*a*, 226*b*, and 226*c* on blade platform 212.

Figure 12A:
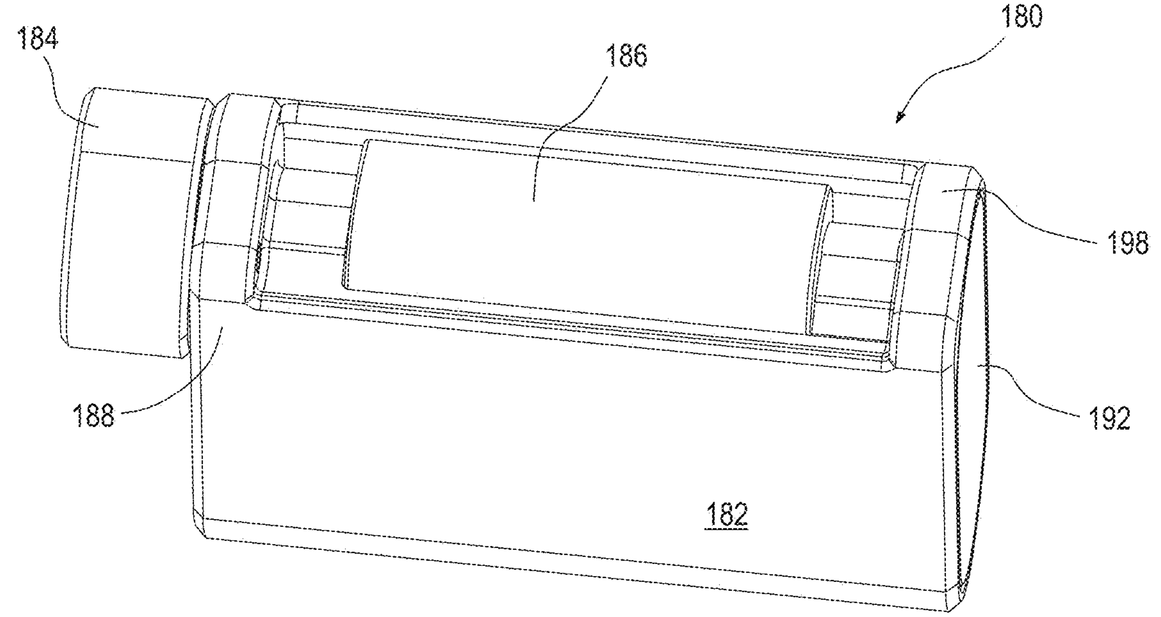
FIGS. 12*a*-12*c* illustrate rotation of the roller to extract a blade from the refillable blade cartridge.
Figure 12B:
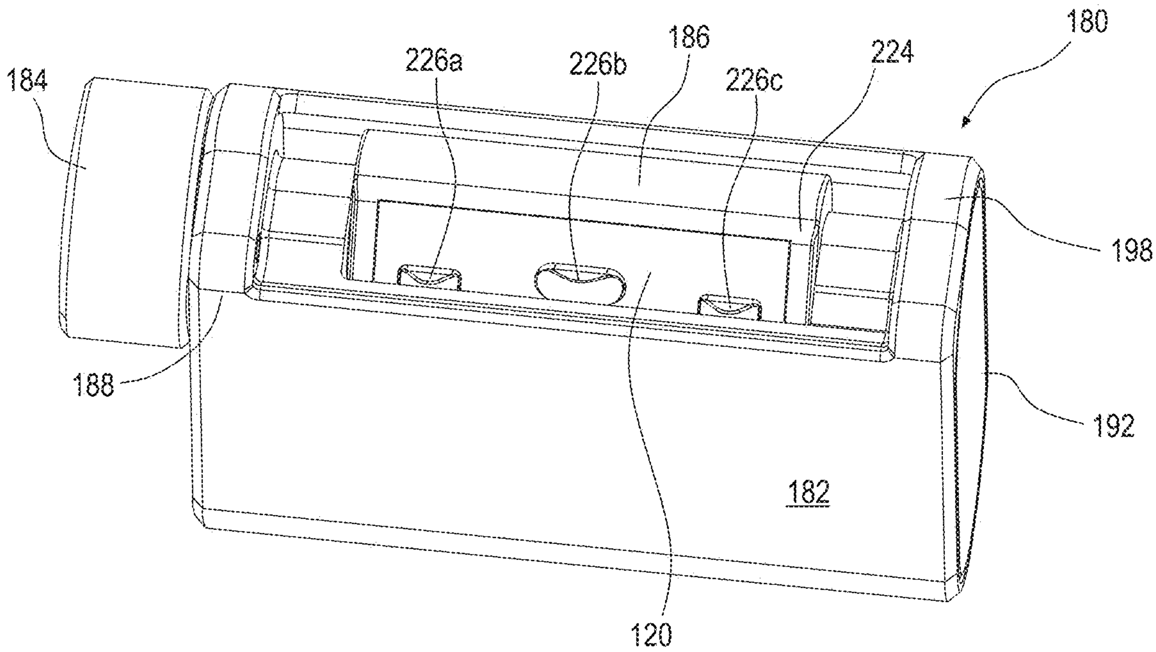
Figure 12C:
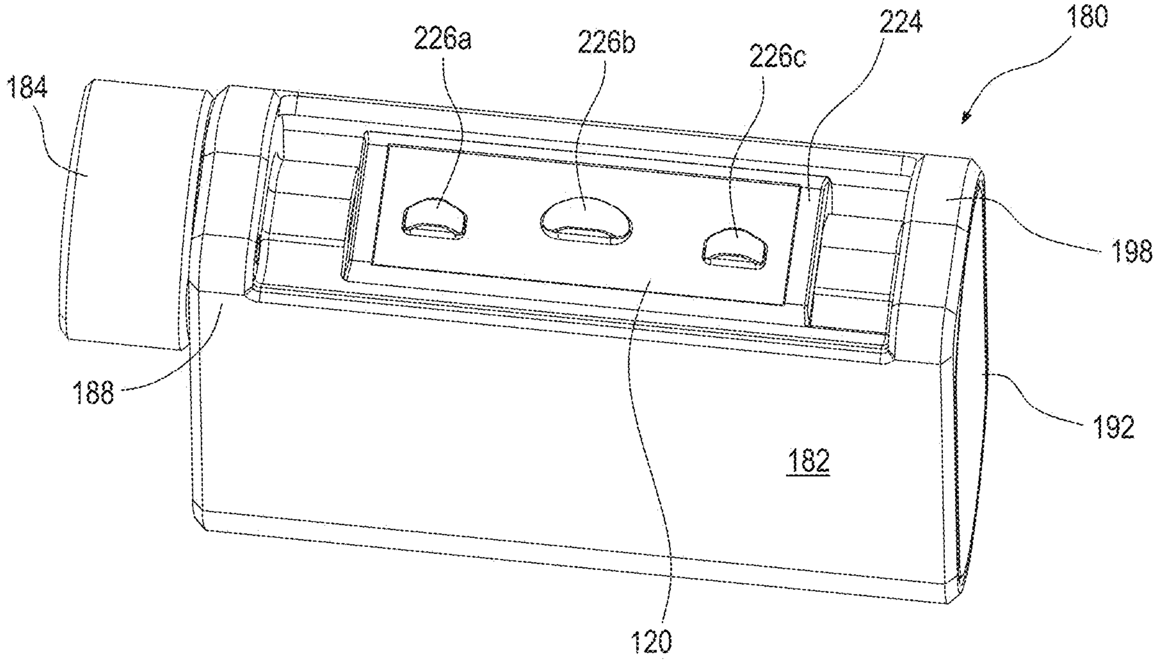

FIGS. 12*a*-12*c* show the operation of blade refill cartridge 180. FIG. 12*a* starts with the pick-up of blade 120 from blade platform 212 of disposable blade drawer 204. Knob 184 turns omni-directional, e.g., counterclockwise, to assist with proper rotation and operation and avoid user induced jamming. The user rotates knob 184 counterclockwise until roller 186 is oriented with roller surface 224 in contact blade 120, as contained with blade platform 212 of disposable blade drawer 204. FIG. 12*b* shows roller 186 partially rotated and blade 120 coming into view. The combination of spring 208 and magnetic attraction pushes blade 120 from blade platform 212 onto keyed risers 226*a*, 226*b*, and 226*c* of roller surface 224, which hold the blade in place on roller surface 224 during rotation of roller 186. The user continues to turn roller 184 until blade 120 is in the load position for razor 100, as shown in FIG. 12*c*. Knob 184 has been rotated to turn roller 186 to (1) pick up a blade 120 and (2) present that new blade in preparation for loading onto razor 100. The user does not come in physical contact with blade 120 for safety and hygiene purposes.

Figure 13A:
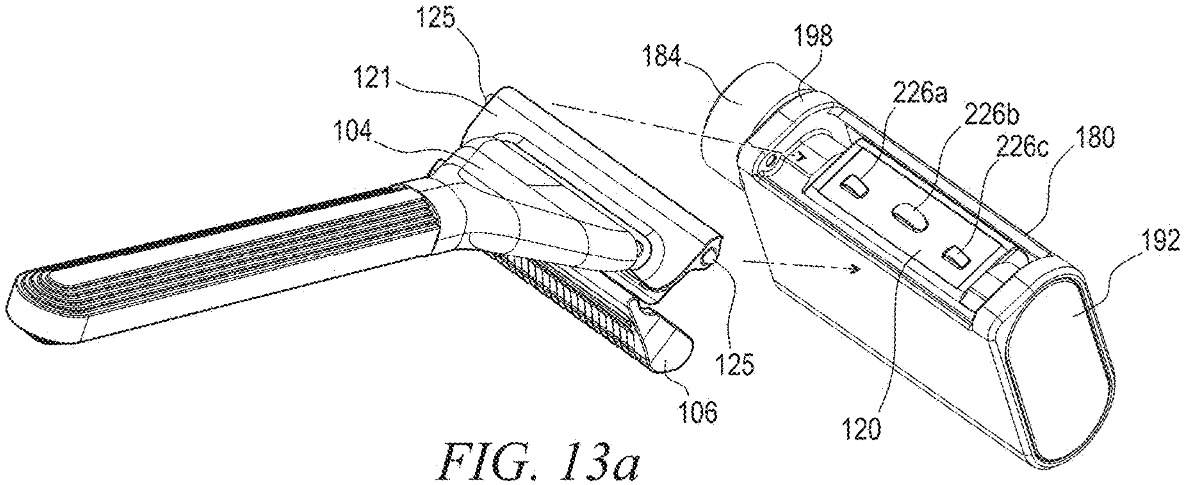
FIGS. 13*a*-13*d* illustrate the handheld razor picking up a blade from the refillable blade cartridge.
Figure 13B:
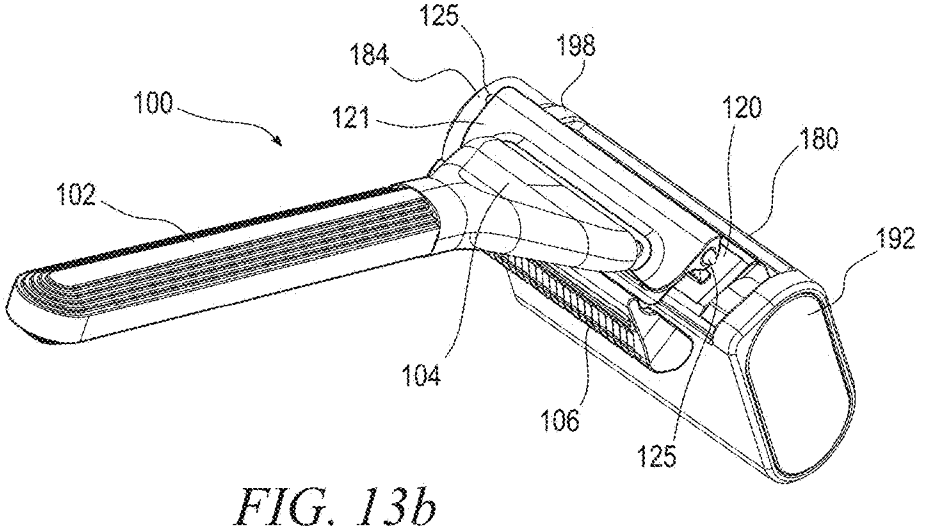
Figure 13C:
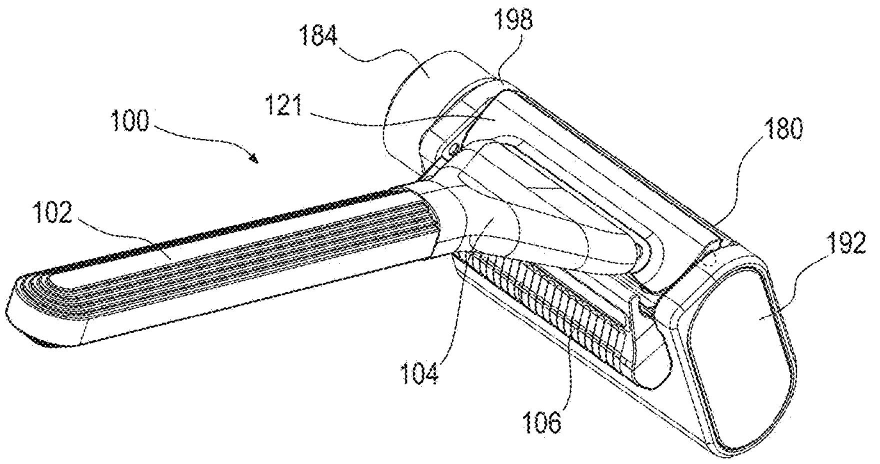
Figure 13D:
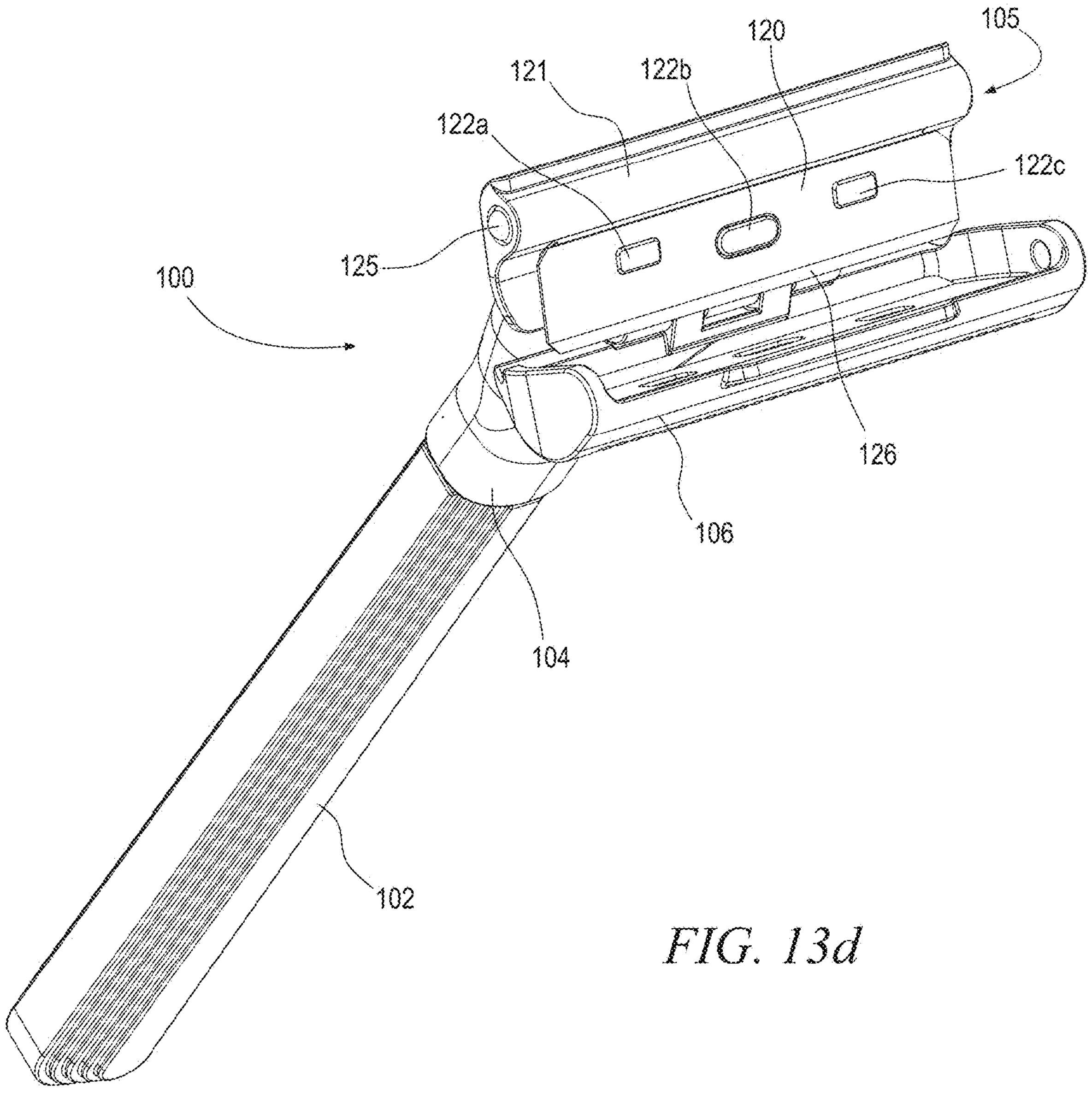

In FIG. 13*a*, head flap 106 is fully opened, as in FIG. 4*d*, and razor 100 is disposed away from and moving toward blade refill cartridge 180 and exposed blade 120. FIG. 13*b* shows head flap 106 is fully opened, and blade platform 121 disposed over blade refill cartridge 180 and exposed blade 120. In FIG. 13*c*, blade platform 121 clips onto blade 120 by ball plunger 125 contacting roller surface 224 to remove the blade from blade refill cartridge 180 using magnetic pickup and securely attach it to the blade platform with keyed risers 122*a*, 122*b*, and 122*c*. In one embodiment, one or more portions of blade platform 121 is made with magnetic material or is otherwise magnetized, as described above. Razor 100 is then withdrawn from blade refill cartridge 180. FIG. 13*d* shows blade 120 disposed on blade platform 121 by magnetic attraction and secured in place with keyed risers 122*a*, 122*b*, and 122*c*. Razor 100 is ready for use with a fresh blade 120. There is no user contact with blade 120 during the blade loading process.

Figure 14A:
FIGS. 14*a*-14*d* illustrate the use of the handheld razor and disposal of a spent blade.
Figure 14B:
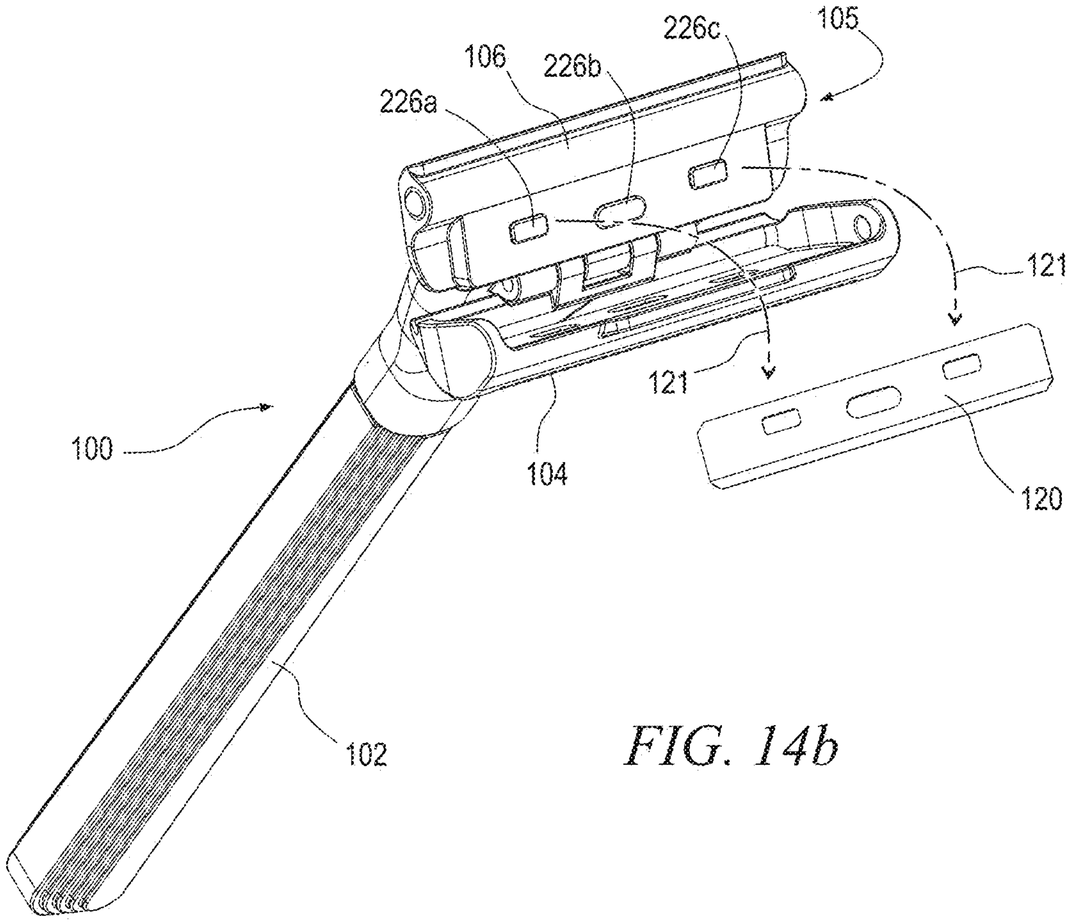
Figure 14C:
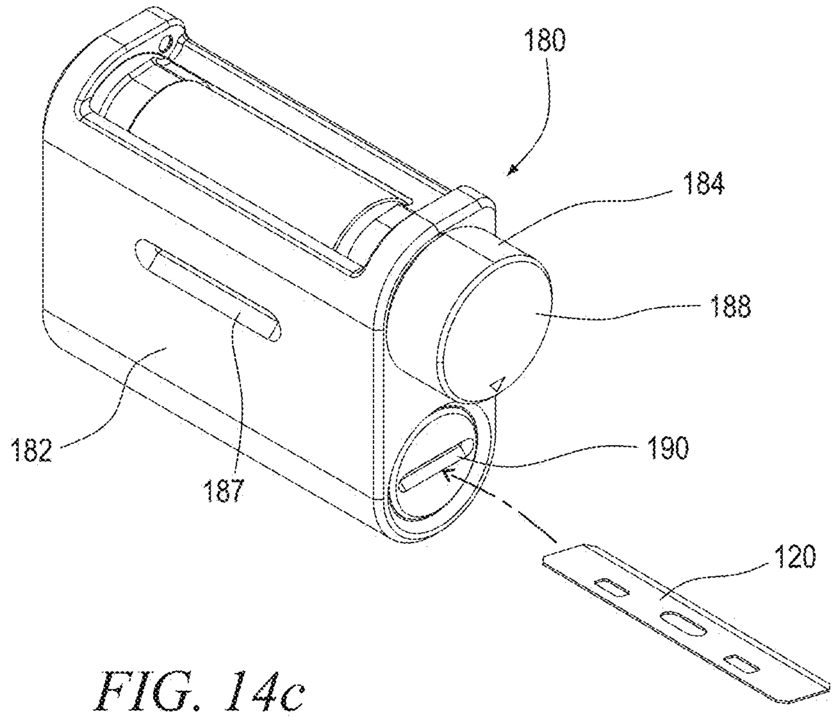
Figure 14D:
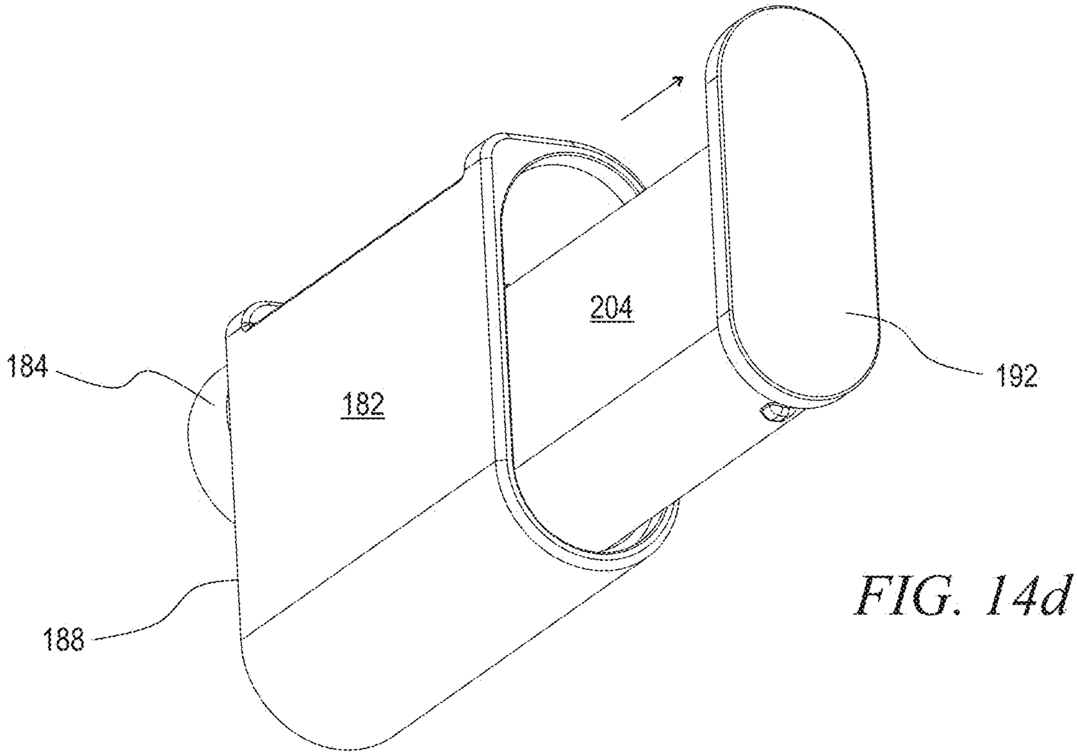

FIG. 14*a* shows user 230 cutting hair strands or beard 232 with razor 100. User 230 controls razor 100 using hand 234. After the shave or other hair cutting treatment. Head flap 106 is opened and blade 120 is removed, as shown in FIG. 14*b*. In FIG. 14*c*, the used blade 120 is then inserted into spent blade disposal slot 190. Spent blades 120 are passed through spent blade disposal slot 190 into a sealed chamber in the bottom portion of blade drawer 204 for later disposal. The sealed chamber provides a factor of safety for user 230. A fresh blade 120 can be placed onto blade platform 121, as described above. Notably, replacing blade 120 can be performed with one hand for safety and convenience. Once all blades 120 in blade refill cartridge 180 are spent, knob 184 is rotated to align arrows 185 and retract keyed risers 226*a*-226*c* allowing disposable blade drawer 204 to be removed, disposed of, and ready for replacement with a fresh disposable blade drawer, as in FIG. 14*d*.

Figure 15A:
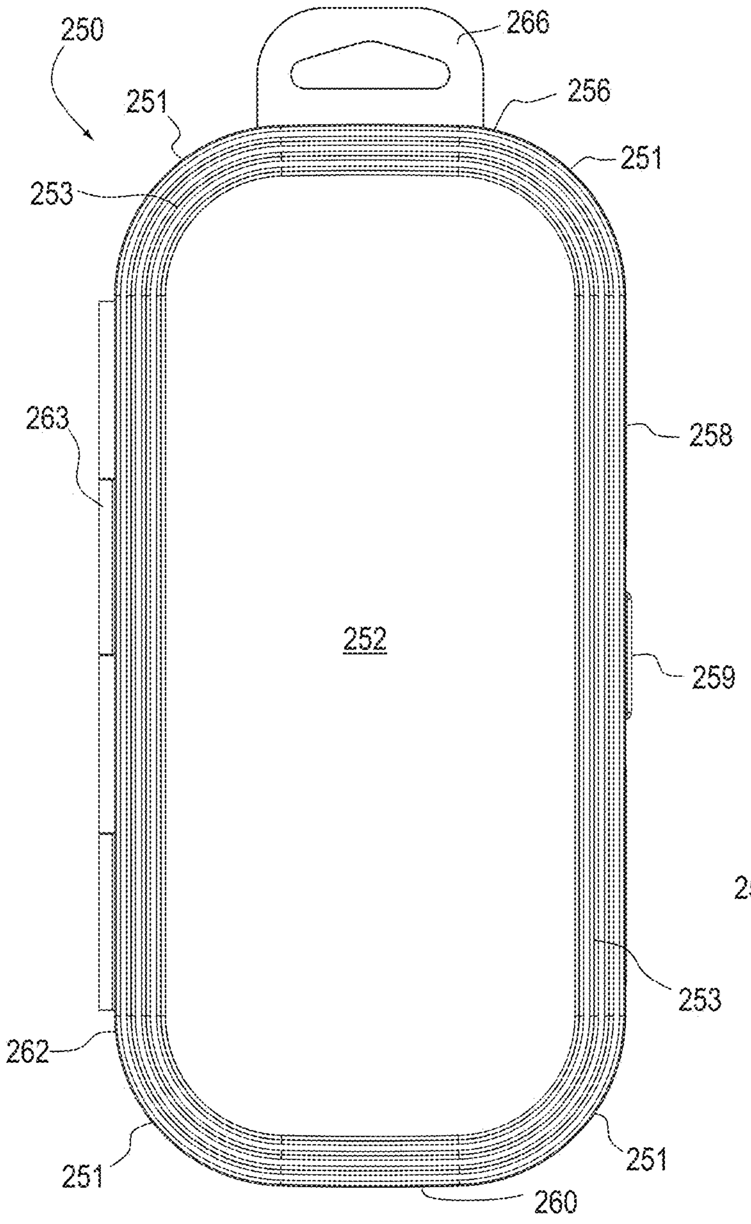
FIGS. 15*a*-15*e* illustrate a case for the handheld razor and refillable blade cartridge.
Figure 15C:
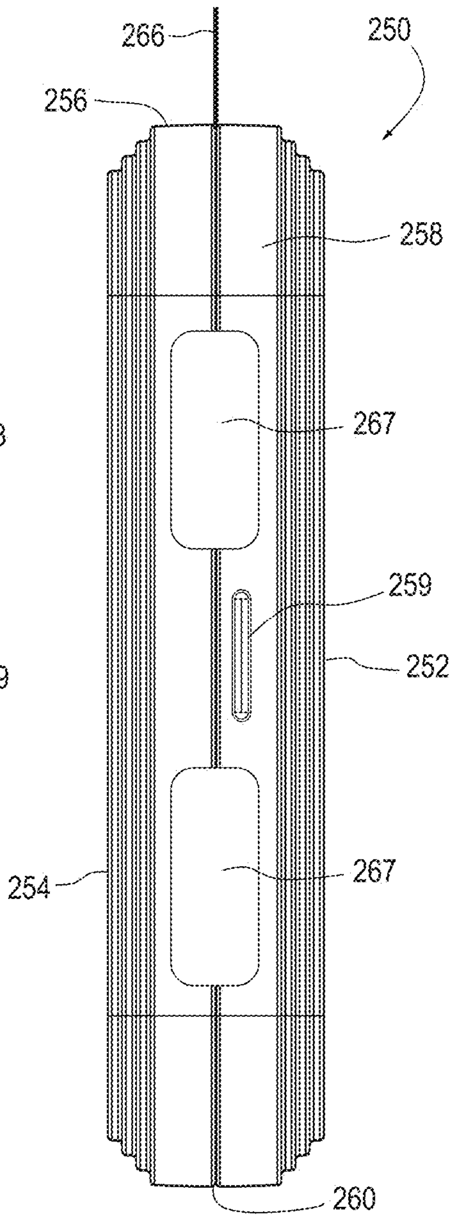
Figure 15E:
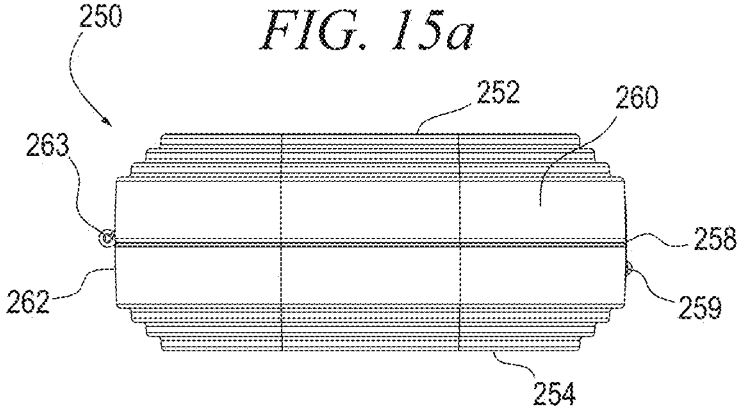
Figure 15B:
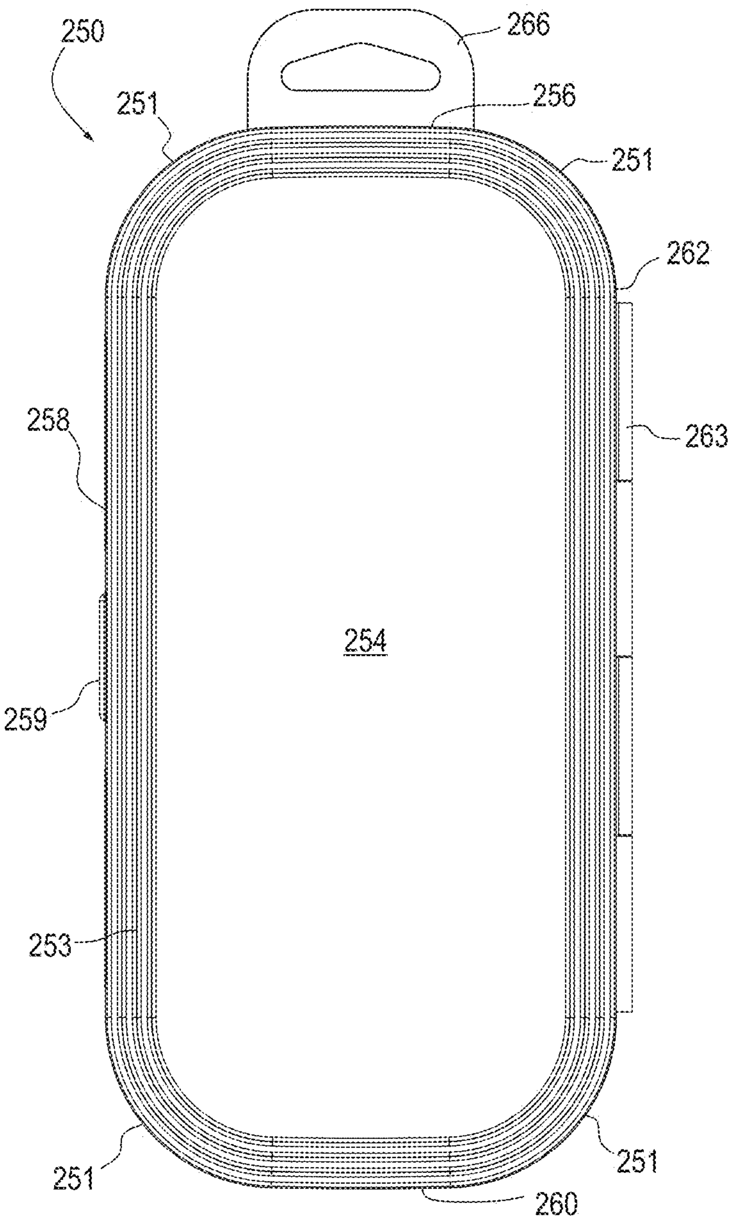
Figure 15D:
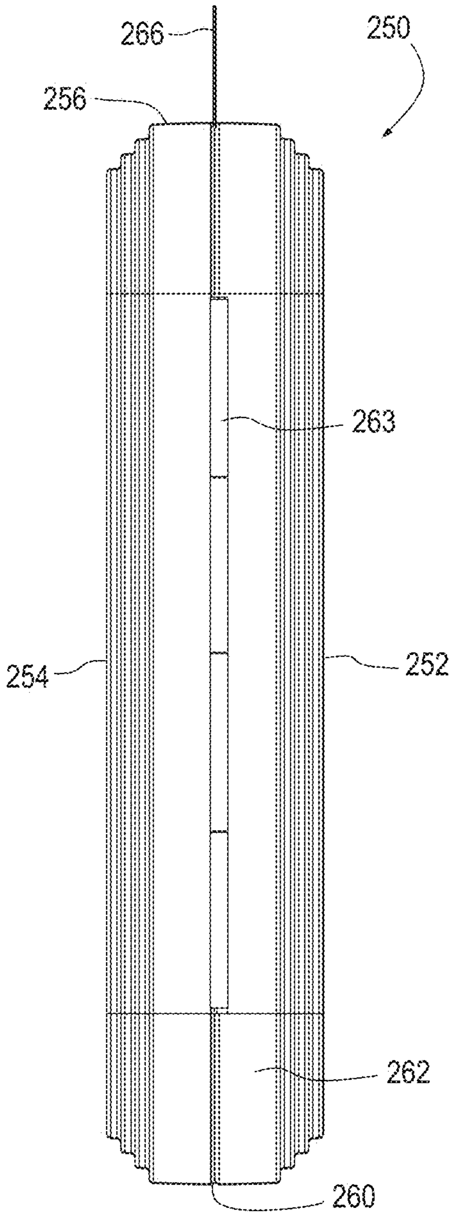

FIG. 15*a* shows a case 250 for razor 100 and blade refill cartridge 180. Case 250 is a reuseable travel case for razor 100 and blade refill cartridge 180, made with polymer or metal. In one embodiment, case 250 is made with tin. Case 250 is notably a rectangular form, rounded off at corners 251, for ease of handling, stable grip, and aesthetic presentation. In fact, perimeter 253 of case 250 is similar to the stepped pattern 107 on handle 102. Case 250 includes top surface 252, bottom surface 254, side surfaces 256-262, locking tab 259, hanger 266, and hinge 263 to open top surface 252 from bottom surface 254. FIG. 15*b* is a bottom view of bottom surface 254, side surfaces 256-262, locking tab 259, hinge 263, and hanger 266. FIG. 15*c* is a first side view of top surface 252, bottom surface 254, side surfaces 256-262, locking tab 259, and hanger 266. Security stickers 267 indicate whether case 250 has been prior opened. FIG. 15*d* is a second side view of top surface 252, bottom surface 254, side surfaces 256-262, hinge 263, and hanger 266. FIG. 15*e* is a third side view of top surface 252, bottom surface 254, side surfaces 256-262, locking tab 259, and hinge 263.

Figure 16:
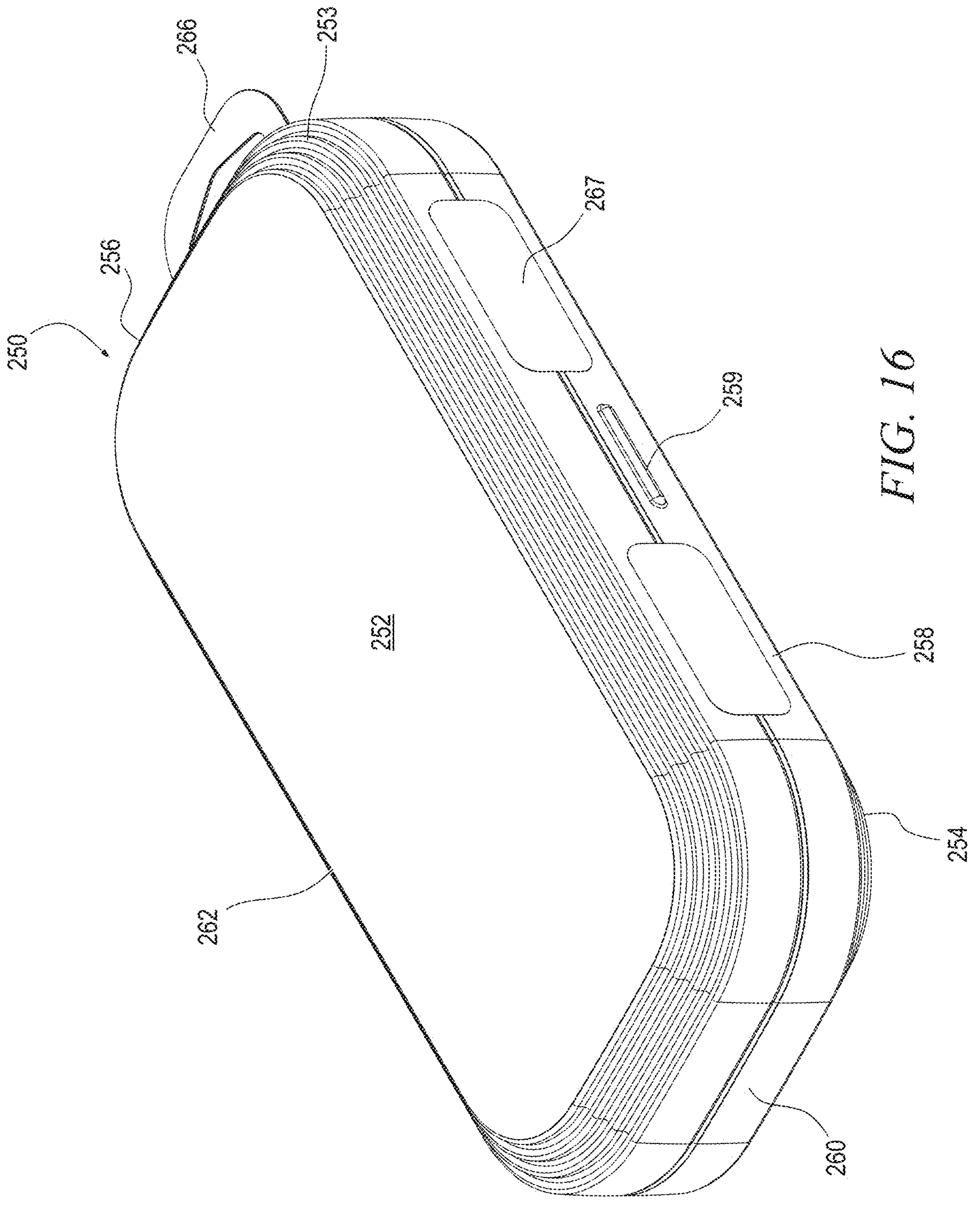
FIG. 16 illustrates a perspective view of the case for the handheld razor and refillable blade cartridge.

FIG. 16 is a perspective view of case 250 with top surface 252, bottom surface 254, side surfaces 256-262, locking tab 259, and hanger 266.

Figure 17A:
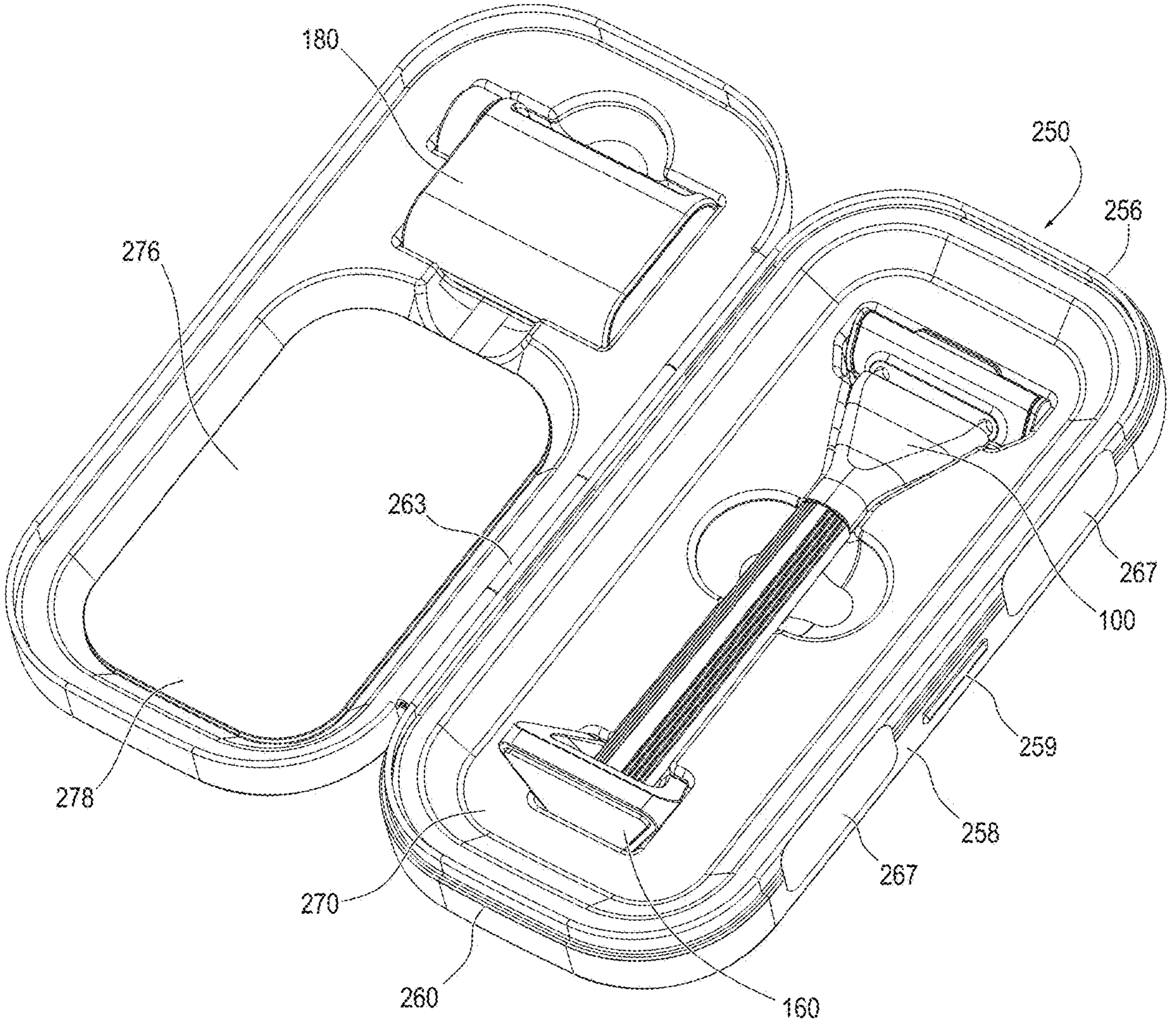
FIGS. 17*a*-17*b* illustrate an internal view of the case for the handheld razor and refillable blade cartridge.
Figure 17B:
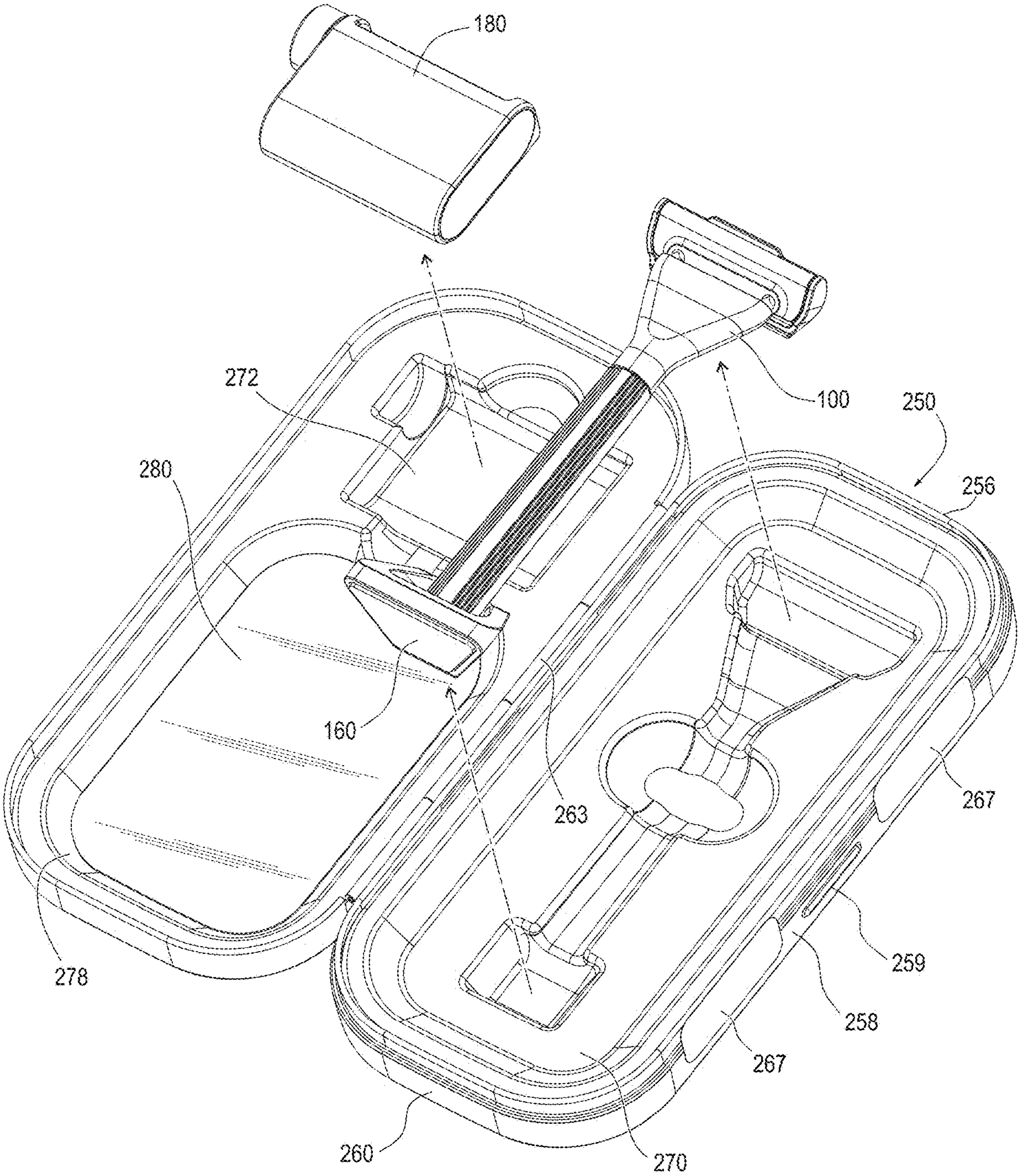

FIG. 17*a* is a perspective view of case 250 opened about hinges 263 to reveal razor 100 disposed in recess 270, blade refill cartridge 180 disposed in recess 272, stand 160 disposed in recess 270, and cover 276 disposed in recess 278. In one embodiment, recesses 270, 272, and 278 are formed as molded paper pulp trays form-fitted to the shape of razor 100, blade refill cartridge 180, and stand 160. FIG. 7*b* is a perspective view of case 250 with razor 100 and stand 160 removed from recess 270 for intended use, blade refill cartridge 180 removed from recess 272 for intended use, and cover 276 removed from recess 278 to reveal mirror 280 to aid with the use of razor 100. Mirror 280 may have magnification properties for a closer view of the target area.

While one or more embodiments of the present invention have been illustrated in detail, the skilled artisan will appreciate that modifications and adaptations to those embodiments may be made without departing from the scope of the present invention as set forth in the following claims.

What is claimed:

1. A razor blade cartridge, comprising:

a housing;

a blade drawer disposed within the housing; and a roller disposed over the blade drawer to pick up a blade from the blade drawer.

2. The razor blade cartridge of claim 1, wherein the blade drawer includes:

a blade platform adapted to hold a plurality of blades; and a spring element to apply pressure to the blade platform.

3. The razor blade cartridge of claim 1, wherein the blade drawer slides into a side of the housing.

4. The razor blade cartridge of claim 1, wherein the blade drawer includes a disposal slot for the blade.

5. The razor blade cartridge of claim 1, further including a knob to rotate the roller to pick up the blade from the blade drawer.

6. The razor blade cartridge of claim 1, wherein the roller includes a magnet to pick up the blade from the blade drawer.

7. A razor blade cartridge, comprising:

a blade drawer; and a roller disposed over the blade drawer to pick up a blade from the blade drawer.

8. The razor blade cartridge of claim 7, wherein the blade drawer includes:

a blade platform adapted to hold a plurality of blades; and a spring element to apply pressure to the blade platform.

9. The razor blade cartridge of claim 7, further including a housing, wherein the blade drawer slides into a side of the housing.

10. The razor blade cartridge of claim 7, wherein the blade drawer includes a disposal slot for the blade.

11. The razor blade cartridge of claim 7, further including a knob to rotate the roller to pick up the blade from the blade drawer.

12. The razor blade cartridge of claim 7, wherein the roller rotates over the blade drawer to pick up the blade from the blade drawer.

13. The razor blade cartridge of claim 7, wherein the roller includes a magnet to pick up the blade from the blade drawer for presentation.

14. A method of making a razor blade cartridge, comprising:

providing a housing;

disposing a blade drawer within the housing; and disposing a roller over the blade drawer to pick up a blade from the blade drawer.

15. The method of claim 14, wherein providing the blade drawer includes:

providing a blade platform adapted to hold a plurality of blades; and providing a spring element to apply pressure to the blade platform.

16. The method of claim 14, further including sliding the blade drawer into a side of the housing.

17. The method of claim 14, wherein providing the blade drawer includes providing a disposal slot for the blade.

18. The method of claim 14, further including providing a knob to rotate the roller to pick up the blade from the blade drawer.

19. The method of claim 18, further including providing a shaft extending from the roller and coupled to the knob.

20. The method of claim 14, wherein the roller includes a magnet to pick up the blade from the blade drawer.

* * * * *